(12) United States Patent
Gray

(10) Patent No.: US 11,082,371 B2
(45) Date of Patent: Aug. 3, 2021

(54) APPOINTMENT NEGOTIATION SYSTEMS AND METHODS

(71) Applicant: Calendar Research LLC, Pasadena, CA (US)

(72) Inventor: Michael Hunter Gray, Santa Monica, CA (US)

(73) Assignee: Calendar Research LLC, Pasadena, CA (US)

( * ) Notice: Subject to any disclaimer, the term of this patent is extended or adjusted under 35 U.S.C. 154(b) by 1183 days.

(21) Appl. No.: 14/254,786

(22) Filed: Apr. 16, 2014

(65) Prior Publication Data

US 2014/0229560 A1 Aug. 14, 2014

Related U.S. Application Data

(63) Continuation-in-part of application No. 13/831,758, filed on Mar. 15, 2013, now Pat. No. 10,803,424.

(60) Provisional application No. 61/639,746, filed on Apr. 27, 2012.

(51) Int. Cl.
*G06Q 10/06* (2012.01)
*H04L 12/58* (2006.01)
*H04L 12/18* (2006.01)
*G06Q 10/10* (2012.01)

(52) U.S. Cl.
CPC ....... *H04L 51/046* (2013.01); *G06Q 10/1095* (2013.01); *H04L 12/1818* (2013.01)

(58) Field of Classification Search
CPC ........... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20

See application file for complete search history.

(56) References Cited

U.S. PATENT DOCUMENTS

| 6,085,166 A * | 7/2000 | Beckhardt ............ G06Q 10/109 705/7.18 |
| 6,101,480 A | 8/2000 | Conmy et al. |
| 2003/0004773 A1 | 1/2003 | Clark et al. |
| 2007/0033271 A1 | 2/2007 | Hullot et al. |

(Continued)

OTHER PUBLICATIONS

U.S. Office Action from U.S. Appl. No. 13/831,758, dated Jul. 20, 2016.

(Continued)

*Primary Examiner* — Patricia H Munson
*Assistant Examiner* — Uche Byrd
(74) *Attorney, Agent, or Firm* — Foley & Lardner LLP

(57) ABSTRACT

One embodiment of the present disclosure relates to a method that includes sending a negotiating message from a user to one or more invitees using a messaging protocol, the negotiating message comprising one or more plans for a meeting, each plan including a time information and a location information for the meeting. The method further includes receiving, using the messaging protocol, one or more responses from the one or more invitees, the one or more responses indicating an approval or rejection of the one or more plans and determining based at least partially on the one or more responses received from the one or more invitees to book the event based on the received responses from the one or more invitees.

13 Claims, 35 Drawing Sheets

(56) References Cited

U.S. PATENT DOCUMENTS

| | | | |
|---|---|---|---|
| 2009/0181653 A1* | 7/2009 | Alharayeri | H04W 4/02 455/414.1 |
| 2009/0271716 A1 | 10/2009 | Jones et al. | |
| 2011/0153380 A1 | 6/2011 | Velusamy | |
| 2012/0191501 A1* | 7/2012 | Olliphant | G06Q 10/06314 705/7.19 |

OTHER PUBLICATIONS

Office Action for U.S. Appl. No. 13/831,758 dated Oct. 15, 2015.
U.S. Office Action dated Mar. 12, 2015 for U.S. Appl. No. 13/831,758.
U.S. Office Action dated Feb. 1, 2017, from U.S. Appl. No. 13/831,758.
Decision on Appeal dated Feb. 13, 2020, from U.S. Appl. No. 13/831,758.
Notice of Allowance dated Jun. 12, 2020, from U.S. Appl. No. 13/831,758.

* cited by examiner

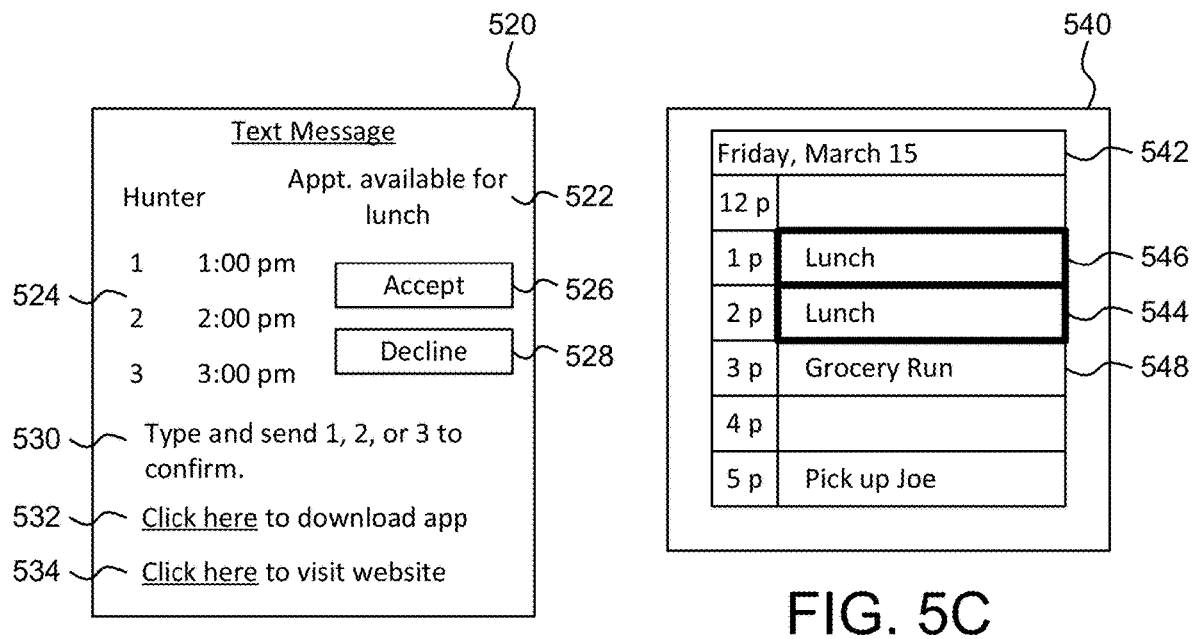
FIG. 5B
FIG. 5C
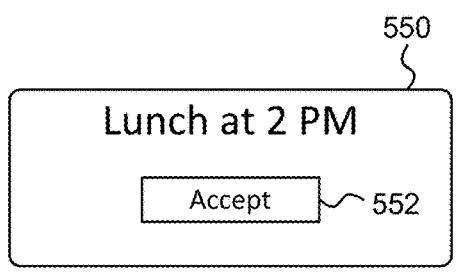
FIG. 5D
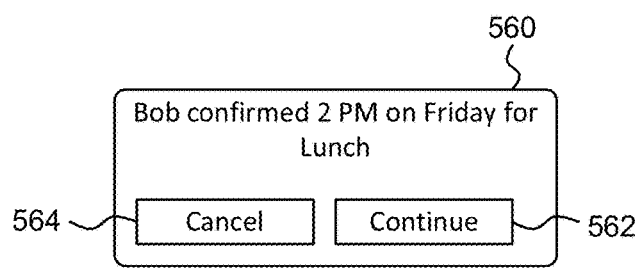
FIG. 5E
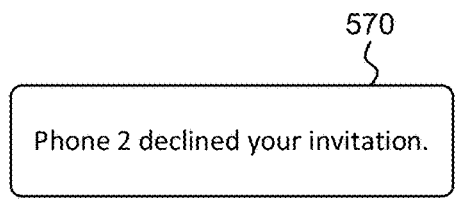
FIG. 5F

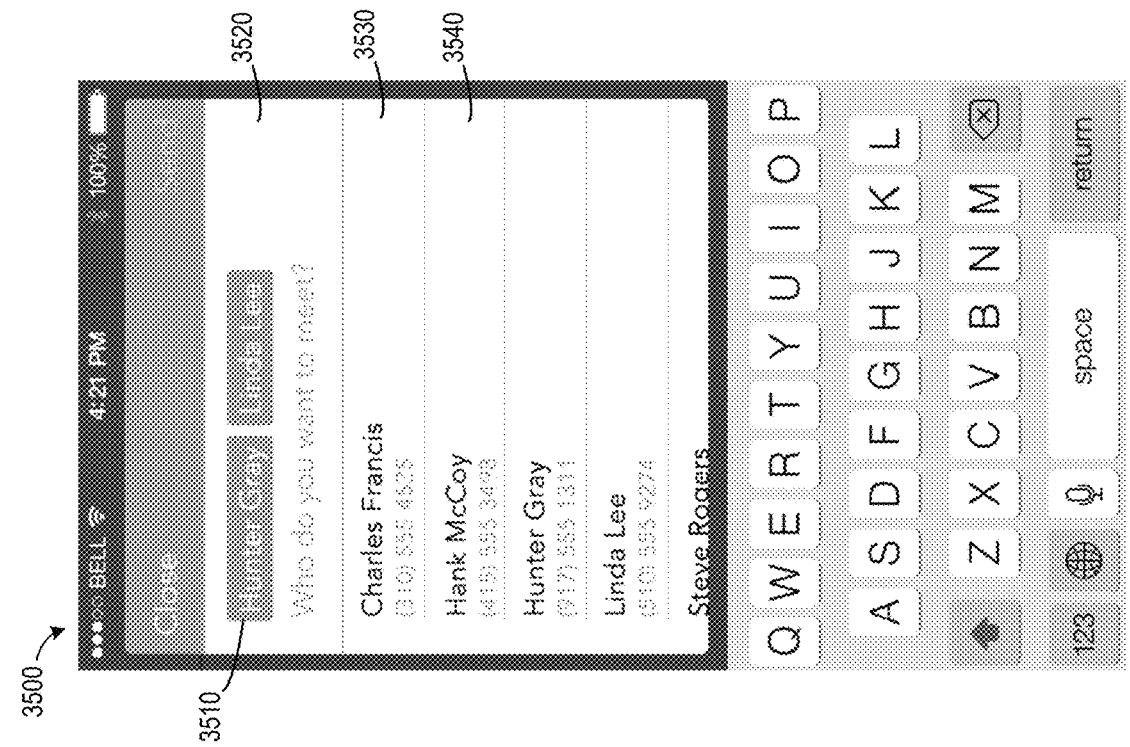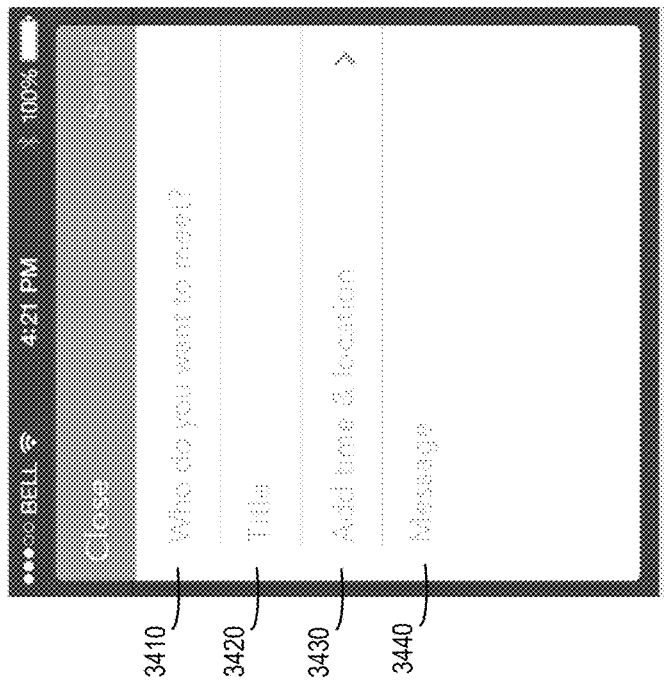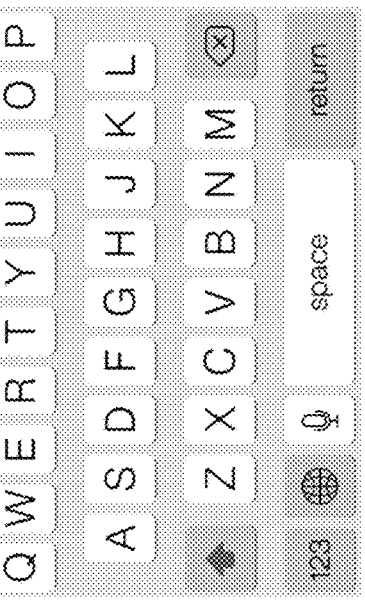
FIG. 34
FIG. 35

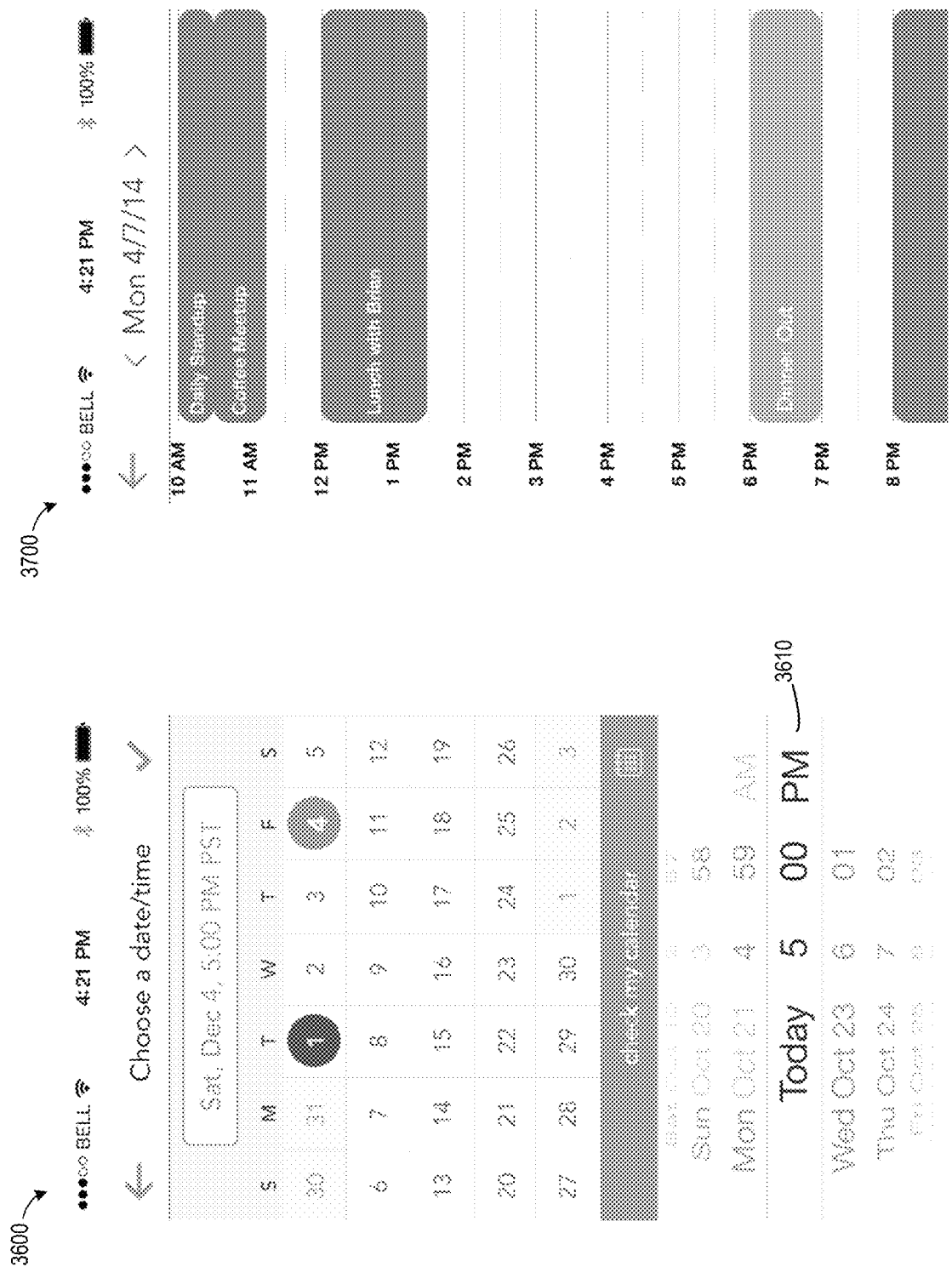

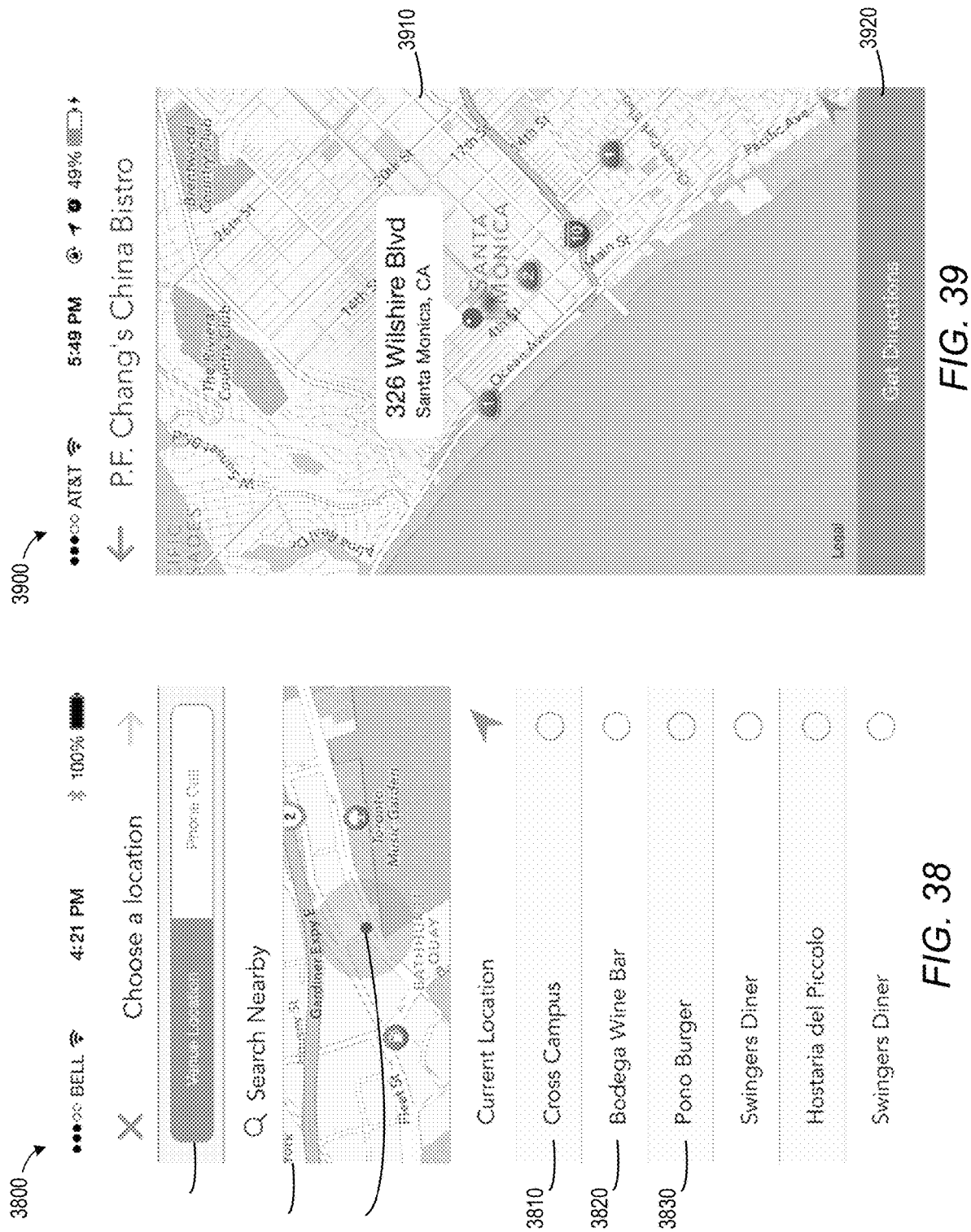

APPOINTMENT NEGOTIATION SYSTEMS AND METHODS

CROSS-REFERENCE TO RELATED PATENT APPLICATIONS

This application claim priority to and is a continuation-in-part of U.S. patent application Ser. No. 13/831,758, filed Mar. 15, 2013, which claims the benefit of and priority to U.S. Provisional Patent Application No. 61/639,746, filed Apr. 27, 2012, both of which are incorporated herein by reference in their entirety.

BACKGROUND

The present disclosure generally relates to the field of scheduling systems. The present disclosure relates more specifically to a scheduling system and method incorporating an appointment negotiation.

Most computer-based collaboration tools are project or team-centric, requiring a setup time and limiting user access. Different users may use different applications to manage interaction with other users. For example, different users may use different calendar applications (e.g., Microsoft Outlook, Google Calendar, iCal, etc.) to manage his or her meetings or appointments, and may use different remote devices (e.g., desktop, laptop, smartphone, tablet, other mobile device, etc.). Some people use e-mail, text messages, or video chat to communicate with other users to reach a consensus on the time and location that is agreeable to everyone. There are many applications that promise to connect individuals; instead, they keep individuals further apart.

SUMMARY

One embodiment of the present disclosure relates to a method that includes sending a negotiating message from a user to one or more invitees using a messaging protocol, the negotiating message comprising one or more plans for a meeting, each plan including a time information and a location information for the meeting. The method further includes receiving, using the messaging protocol, one or more responses from the one or more invitees, the one or more responses indicating an approval or rejection of the one or more plans and determining based at least partially on the one or more responses received from the one or more invitees to book the event based on the received responses from the one or more invitees.

Embodiments are directed to a method for receiving from a first user an identification information of a second user, receiving from a first user the desire to have a meeting with a second user and determining, by a computer system, one or more times that the first user and the second user can have the meeting based at least partially on comparing the calendar information of the first user and with the calendar information of the second user to identify available dates and times for the meeting.

Another embodiment of the present disclosure relates to a method for providing a scheduling service to two remote devices. The method includes receiving a request from a first remote device to generate an appointment request, wherein the request includes two or more possible appointment times. The method further includes transmitting the appointment request including the two or more possible appointment times to the second remote device. The method further includes receiving a selection of an appointment time from the two or more possible appointment times from the second remote device. The method further includes transmitting an indication of the selection of the appointment time to the first remote device.

Another embodiment of the present disclosure relates to a method for providing a scheduling service to a first remote device and a plurality of second remote devices. The method includes receiving a request from the first remote device to generate an appointment request, wherein the request includes two or more possible appointment times. The method further includes transmitting the appointment request including the two or more possible appointment times to the plurality of second remote devices. The method further includes receiving a selection of an appointment time from the two or more possible appointment times from at least one of the second remote devices. The method further includes transmitting the selection of appointment times to the first remote device and receiving a selection of an appointment time from the first remote device. The method further includes transmitting an indication of the selection of the appointment time to the plurality of second remote devices. The indication may include a vote on each appointment time identifying a user preference to each appointment time.

Yet another embodiment of the present disclosure relates to a server for providing scheduling services to at least two remote devices. The server includes a communications interface for transmitting scheduling options to the at least two remote devices and receiving user inputs from the at least two remote devices. The server further includes a processing circuit configured to manage scheduling services for the at least two remote devices.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIGS. 5A-F are illustrations of example user interfaces generated in the process of FIG. 4, according to an exemplary embodiment.

FIG. 34 is a user interface screen that may be generated by the system shown in FIG. 1, according to an exemplary embodiment.

FIG. 35 is a user interface screen that may be generated by the system shown in FIG. 1, according to an exemplary embodiment.

FIG. 36 is a user interface screen that may be generated by the system shown in FIG. 1, according to an exemplary embodiment.

FIG. 37 is a user interface screen that may be generated by the system shown in FIG. 1, according to an exemplary embodiment.

FIG. 38 is a user interface screen that may be generated by the system shown in FIG. 1, according to an exemplary embodiment.

FIG. 39 is a user interface screen that may be generated by the system shown in FIG. 1, according to an exemplary embodiment.

DETAILED DESCRIPTION OF THE EXEMPLARY EMBODIMENTS

Figure 1:
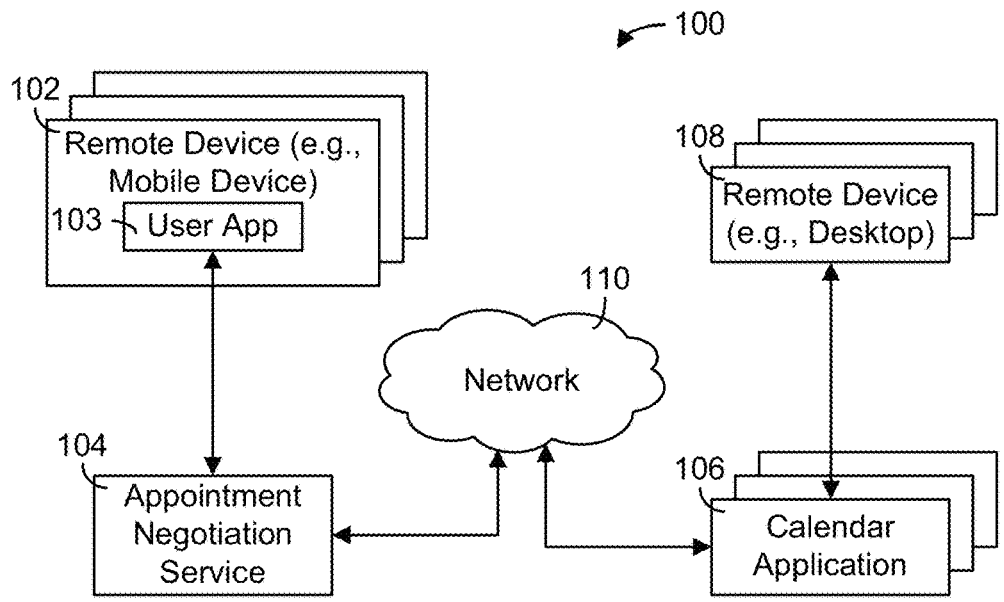
FIG. 1 is a block diagram of a computerized system for providing an appointment negotiation service to one or more users, according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, appointment negotiation systems and methods are shown and described. The systems and methods herein may be used by two or more users for scheduling an appointment, meeting, or event; negotiating or deciding an appointment time; and other appointment, meeting, or event decisions, including but not limited to an appointment location, a dial-in number, privacy settings, invitee priority level (i.e., who should respond to the invite first), etc. The systems and methods described herein allows a user to perform such tasks through a user application on a remote device. The user application may be configured to receive and send appointment information, and to sync appointment or meeting information with other applications (such as a calendar application). In one embodiment, a user may use the user application to create an appointment invitation to one or more other users, and may select one or more possible times for the appointment. The other users may use the user application or another application to accept, decline, or propose a counter-offer for the appointment.

In one embodiment, the systems and methods herein may be used by two users to schedule an appointment. A first user may use the user application to create an appointment, including two or more possible appointment times. The appointment and possible appointment times may be sent to the second user, who chooses one of the appointment times or sends a counter offer. A scheduling service may be configured to manage the process by sending out alerts to both users about the appointment and decisions, and by managing a calendar application of each user.

In one embodiment, the systems and methods herein may be used by more than two users to schedule an appointment. A first user may use the user application to create an appointment, including two or more possible appointment times. The appointment and possible appointment times may be sent to a plurality of other users. The other users may select a preferred appointment time, indicate a preference about each appointment time, or otherwise. A scheduling service may be configured to receive the other user selections and provide the user selections to the first user. The first user may then select an appointment time based on the user selections. The scheduling service may be configured to then send alerts to the other users about the selection and to otherwise manage the scheduling process by managing a calendar application, etc.

In one embodiment, the systems and methods herein may create a cloud-based negotiation system that allows two or more users to negotiate in setting up an appointment, without the users using another calendar application or email. A user interface configured to allow the users to set up and negotiate appointments may be used in place of other calendar applications or email. Two or more users may set up, negotiate, and finalize an appointment through the use of push notifications only.

Referring generally to FIG. 1, a block diagram of a computerized system 100 for providing an appointment negotiation service to one or more users is shown, according to an exemplary embodiment. System 100 is shown to include one or more remote devices 102 (e.g., a mobile device) connected to a scheduling system 104 via network 110. Remote device 102 may be a mobile device (e.g., mobile phone, PDA, smartphone, etc.) configured to run a mobile application 103 (system 103), according to one embodiment. The plurality of remote devices 102 may connect to an appointment negotiation system 104. Appointment negotiation system 104 may provide appointment services as generally described in the present disclosure to a remote device 102 and application 103. Appointment negotiation system 104 may provide data and user interface services to mobile application 103 of remote device 102. For example, appointment negotiation system 104 may provide user interfaces that allow a user to set up an appointment and select appointment times, allow a user to accept, reject, or provide a counter offer to the appointment and appointment times, or other appointment negotiation activities as described herein. The activities of remote device 102 are shown in greater detail in FIG. 2. The activities of appointment negotiation system 104 are shown in greater detail in FIG. 3.

Appointment negotiation system 104 may receive and transmit data to and from remote device 102. For example, appointment negotiation system 104 may transmit information to remote device 102 relating to a calendar entry. If a user is to receive an invitation to an appointment, appointment negotiation system 104 may be configured to send the invitation data along with data that may be used by remote device 102 to create an entry on a calendar application of the user. Calendar applications may be any type of application configured to track a user's appointments, meetings, and other time-based or calendar-based events. Such examples of calendar applications may include iCal, Google Calendar, Microsoft Outlook, etc.

In one embodiment, appointment negotiation system 104 may create a calendar entry to transmit to remote device 102. The calendar entry may relate to an appointment and appointment times proposed by another user. Application 103 may be configured to receive the calendar entry information and to sync the information with a calendar application of remote device 102. In another embodiment, appointment negotiation system 104 may be configured to receive calendar entry information for a calendar entry from a user input via application 103.

In one embodiment, appointment negotiation service 104 may communicate with remote device 102 and transmit the appointment data such that remote device 102 and application 103 manages a calendar application of the remote device. In another embodiment, other remote devices may not have application 103, or may not be a mobile device. In such a case, appointment negotiation system 104 is shown connected to a network 110. Appointment negotiation system 104 may receive information from various calendar applications 106 via network 110 for users of remote devices 108 (e.g., desktops, laptops, etc.). This may allow a user without application 103 or a remote device 102 configured to run application 103 to interact with appointment negotiation system 104.

Remote device 102 may be configured to connect via a wireless connection with appointment negotiation system 104, according to one embodiment. The wireless connection may be a local area network (LAN) connection, wide area network (WAN) connection, or any other type of wireless connection. Alternatively or additionally, remote device 102 may connect via a wired connected or via any other type of connection. Network 110 may be a mobile phone network, the Internet, a combination thereof, etc.

Figure 2:
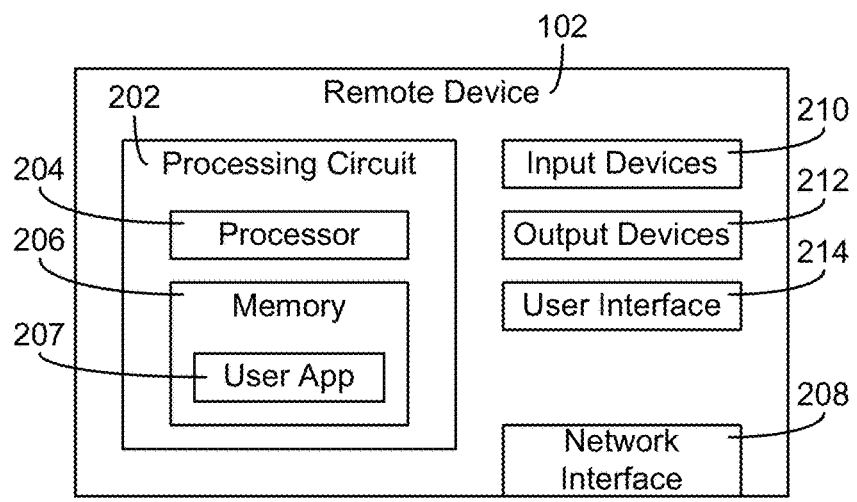
FIG. 2 is a block diagram of the remote device of FIG. 1, according to an exemplary embodiment.

Referring to FIG. 2, a more detailed block diagram of remote device 102 is shown. Remote device 102 may be used for interaction with appointment negotiation service 104 (e.g., for viewing appointment invitations, for creating an appointment, etc.). Remote device 102 includes a processing circuit 202 which includes processor 204 and memory 206. Processor 204 may be implemented as a general purpose processor, an application specific integrated circuit (ASIC), one or more field programmable gate arrays (FPGAs), a group of processing components, or other suitable electronic processing components. Memory 206 is one or more devices (e.g., RAM, ROM, flash memory, hard disk storage, etc.) for storing data and/or computer code for completing and/or facilitating the various user or client processes, layers, and modules described in the present disclosure. Memory 206 may be or include volatile memory or non-volatile memory. Memory 206 may include database components, object code components, script components, or any other type of information structure for supporting the various activities and information structures of the present disclosure. Memory 206 is communicably connected to processor 204 and includes computer code or instruction modules for executing one or more processes described herein.

Memory 206 is shown to include user app module 207 for launching user application 103. User app module 207 may be a standalone application installed on remote device 102 for assisting with the appointment negotiation process. Many of the resources for providing user interfaces for user application 103 may be stored on remote device 102 and the back-end data may be received by user app module 207 from appointment negotiation system 104. Referring generally to the later figures, various illustrations of example applications provided by user app module 207 are shown.

Remote device 102 further includes a network interface 208 configured to communicate with appointment negotiation system 104 via a wireless connection. Remote device 102 further includes input devices 210 and output devices 212. Input devices 210 may include any input device (touchscreen, telephone keypad, pointer, etc.) that may be used by a user to interact with user app 103. Output devices 212 may include display screens, speakers, and/or any other visual or audio components for providing a user of remote device 102 with feedback such as appointment information as described herein. User interface 214 may be any sensor or other control configured to accept or detect a user input and to interpret the user input. Remote device 102 may include any number or types of input devices 210, output devices 212, and user interfaces 214 that interact with user application 103 and appointment negotiation system 104.

Figure 3:
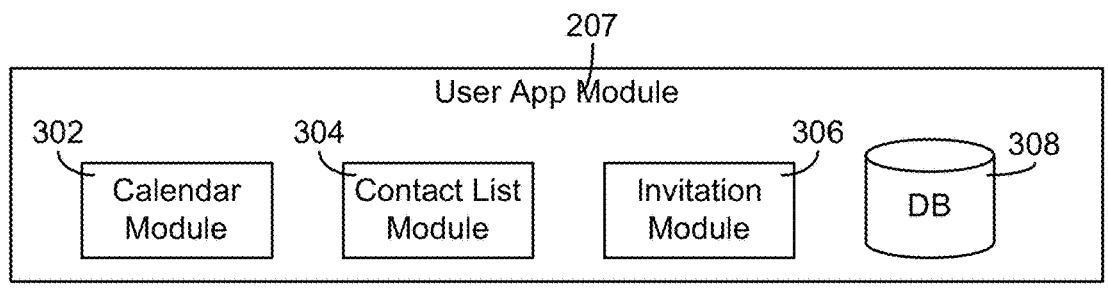
FIG. 3 is a block diagram of a user app module of the remote device of FIG. 2, according to an exemplary embodiment.

Referring to FIG. 3, the activities of user app module 207 are shown in greater detail. User app module 207 may be configured to synchronize with other applications on remote device 102, transmit or receive data from the other applications, etc. The activities of user app module 207 may be used to support the activities of appointment negotiation system 104.

User app module 207 may be configured to synchronize with a calendar application at calendar module 302. Calendar module 302 may be configured to provide appointment information to a calendar application of remote device 102. Further, calendar module 302 may be configured to retrieve calendar information such as a list of appointments, meetings, and events, along with details for each appointment such as a time, attendees, location, or other information. The information may be used, for example, to present a list of available times to a user attempting to set up an appointment, to determine other conflicts, to view user preferences, etc. Calendar module 302 may be configured to retrieve calendar information from multiple calendars, and to combine the calendar information for use as described in the present disclosure. In another embodiment, instead of working with information from another calendar information calendar module 302 may be configured to manage its own calendar application for the user.

User app module 207 may further include a contact list module 304. Contact list module 304 may be configured to retrieve a contact list from, for example, an address book of the user of remote device 102. Contact list module 304 may provide the user with a list of people to select to invite to an appointment. Contact list module 304 may further retrieve other information related to the people on the contact list (e.g., phone number, email, location, calendar, etc.) that may be used by the user while setting up the appointment. For example, such information may be retrieved from social media sites (e.g., Twitter, Facebook, etc.), email services (e.g., Gmail, Yahoo! Mail, etc.), a personal information manager (e.g., Outlook, Exchange, etc.), or any other source that may be accessible by remote device 102. Contact list module 304 may further provide a user interface that allows the user to manually enter contact information of a user, and may be configured to store the contact information in database 308.

User app module 207 may further include an invitation module 306 configured to provide the user with a user interface for setting up an invitation. For example, the user interface may allow the user to specify a name for the appointment, a description of the appointment, proposed appointment times, if the appointment is recurring, or other information. Invitation module 306 may be set up to allow the user to contextually select and choose appointment times in the setup of the appointment. For example, the user may access a calendar application generated by calendar module 302 while setting up the invitation, allow the user to view his or her own schedule to determine ideal appointment times. The contextual selection highlights certain events using coloring or shading.

User app module 207 may further include database 308. Database 308 may be configured to store user information provided by other users via appointment negotiation system 104. For example, a user response to an appointment invitation, along with all accompanying data, may be stored by database 308. Referring generally to subsequent figures, the other user data displayed to a first user via user app module 207 may be stored in database 308.

User app module 207 may be configured to synchronize with other applications as mentioned above. For example, any time a user alters something in an application (e.g., calendar, email, etc.), the change may be synchronized into user app module 207, and vice versa.

One-to-One Scheduling

Figure 4:
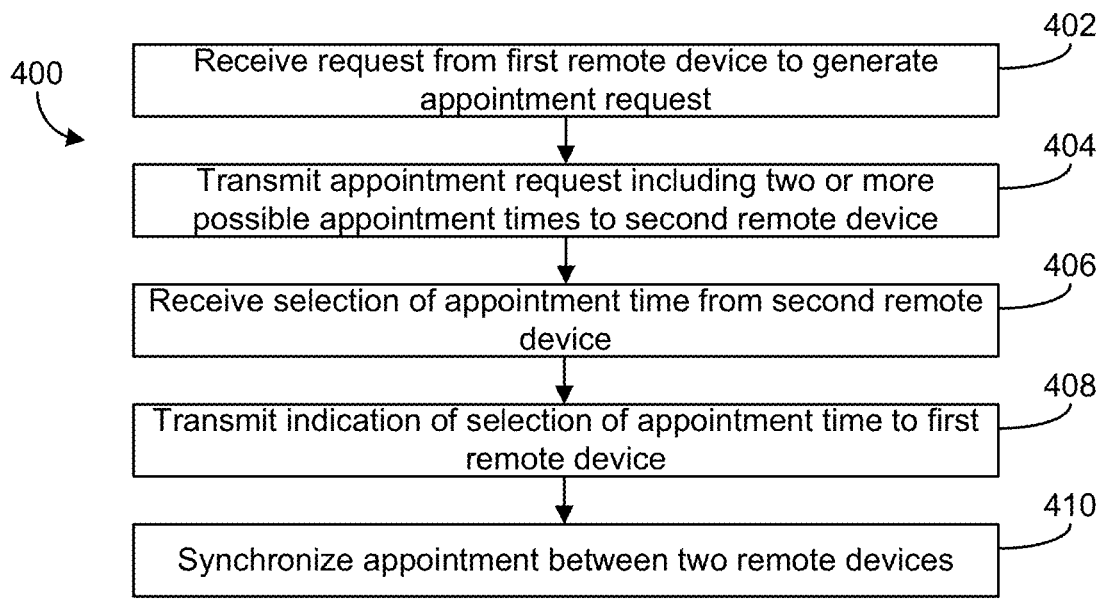
FIG. 4 is a flow chart of a process for one-to-one scheduling using the appointment negotiation service of the present disclosure, according to an exemplary embodiment.

Referring now to FIG. 4, a flow chart of a process 400 for one-to-one scheduling using the appointment negotiation service is shown, according to an exemplary embodiment. Process 400 may be executed by, for example, appointment negotiation system 104 for two users (a first user using a first remote device and a second user using a second remote device) attempting to set up an appointment.

Figure 5A:
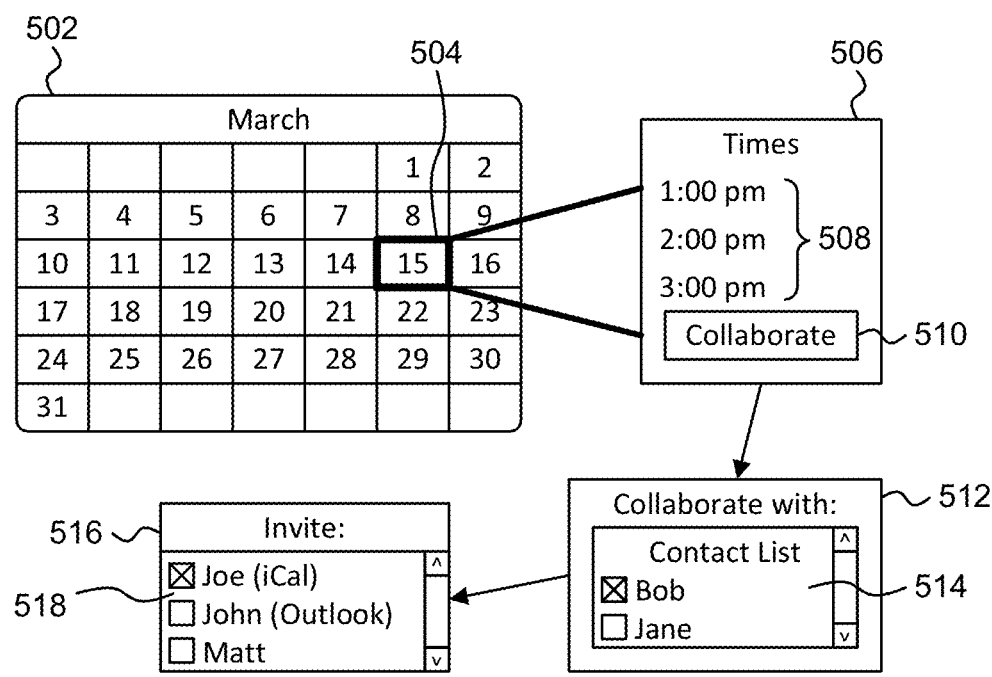

Process 400 includes receiving a request from the first remote device to generate an appointment request (step 402). The appointment request may be generated by a user using user app module 207. The appointment request may generally include a date, a name or title for the meeting, a description of the meeting, a location, the person being invited, and multiple proposed times for the appointment. For example, FIG. 5A illustrates various user interfaces that may be presented to a user generating an appointment request via user app module 207. The user may be presented with a calendar 502 and may select a particular date 504 for the appointment. Upon selecting date 504, user app module 207 may pop up a list of possible times for the appointment. The list of possible times may be generated based on user availability (determined using other calendar information), user preferences, etc. The user may select at least two appointment times 508 (e.g., 1 PM, 2 PM, 3 PM, etc.) and then choose collaboration button 510. Upon pressing button 510, the user may be presented with a user list 514 in a new window 512 to possibly invite to the appointment. User list 514 may be users who also have user app module 207 and are capable of negotiating the appointment times via user app module 207. The user may select a user from user list 514. Alternatively, if the user wants to invite another user who does not have user app module 207, the user may be presented with a window 516 including a contact list 518 of other users. In one embodiment, instead of providing displays windows 512, 516 separately, the windows may be provided together. After finalizing all appointment details, the user may send the invitation, and appointment negotiation system 104 may receive the invitation and invitation details at step 402. It should be understood that while the displays shown in FIG. 5A are shown independently, the displays might be part of a contextual view provided by user app module 207. In other words, the displays may be part of a calendar application that the user may interact with, instead of being provided as a separate application.

Step 402 may further include, at user app module 207, creating a calendar entry for each appointment time of the appointment. For example, a calendar entry marking a "tentative" appointment may be created at 1 PM, 2 PM, and 3 PM.

Process 400 further includes transmitting the appointment request, including the two or more possible appointment times, to the second remote device (step 404). In one embodiment, if the second remote device does not include user app module 207, the second remote device may receive a text message or email with the invitation information. For example, FIG. 5B illustrates a sample text message 520. Text message 520 includes a description 522 of the appointment and the person sending the appointment, a listing 524 of proposed appointment times, and two links 526, 528 or accepting or declining the invitation. Text message 530 may further include a message 530 providing instruction to the user. The user may accept or decline the invitation by selecting the appropriate link 526, 528 and then typing in 1, 2, or 3 to indicate a chosen time. Text message 520 may further include a link 532 that the user may click to download an application to install user app module 207. Text message 520 may further include a link 534 that the user may click to visit a website. The website may then allow the user to respond to the appointment invitation. The website may further provide the user with a downloadable file with appointment information that may be used to create an entry on the user's calendar application.

In another embodiment, the user without user app module 207 may receive an email with invitation information. The email may include a link to a website where the user may accept, decline, or propose a counter offer to the invitation. The email may further include a calendar attachment (e.g., Outlook, iCal and/or Google Calendar attachments) that the user may use for his or her own calendar application.

In one embodiment, if the remote device does not have user app module 207, after the user has finalized the appointment with the first user, the user may enter his or her calendar application credentials. Appointment negotiation system 104 may then provide a display (e.g., on a website) that displays the calendar information of the user from the calendar application, including a new calendar entry for the new appointment just finalized. The appointment negotiation options typically provided on user app module 207 may then be provided via the display.

If the user does have user app module 207, step 404 may include transmitting the appointment request to the remote device and creating a push notification for the remote device. Further, the appointment request information may be used to populate an entry in a calendar application of user app module 207. For example, referring to FIG. 5C, a calendar application 540 is shown after receipt of the appointment invitation. The appointment invitation is shown to automatically populate calendar 542 with entries 544, 546. The entries may be highlighted according to various settings of calendar application 540. For example, calendar application 540 may indicate each proposed appointment time as "tentative." Each appointment time may be highlighted in color (e.g., yellow), shaded, or otherwise distinguished from other appointments on the calendar. Calendar application 540 may be configured to determine whether to display each appointment time as its own calendar entry. For example, entry 548 does not show as a possible appointment time because the user already has something scheduled, even though the appointment time was part of the appointment request. As another example, entry 548 may show the possible appointment time, but the entry may be shaded or include an icon that indicates the conflict.

The user of the second remote device may select an appointment time, and a selection of the appointment time may be received by appointment negotiation system 104 (step 406). For example, referring to FIGS. 5C-D, a user may select calendar entry 544 to pop up message 550 of FIG. 5D. The selection of the calendar entry may vary. In one embodiment, the user may view a calendar entry, and the application may be configured to display an "accept" button. The user may then select the button to select the time, or scroll to another appointment time. The user may then confirm via button 552 that he or she wishes to select that time for the appointment.

Step 406 may include receiving a notification that a user has declined each appointment time, or the appointment in general. The user may be prompted to suggest another time (see FIG. 6), or to provide a message explaining the denial to be provided to the first user.

Process 400 further includes transmitting an indication of a selection of an appointment time to the first user using the first remote device (step 408). For example, the user of the first remote device may receive a push notification, such as one shown in window 560 of FIG. 5E, that the other user has accepted an appointment time. The user may then confirm the appointment via button 562 or cancel the appointment (or edit appointment details) via button 564. Alternatively, window 560 may not include such options, and may simply indicate that the appointment has been booked. As another example, the user of the first remote device may receive a push notification, such as one shown in window 570 of FIG. 5F, notifying the user that the other user has declined the invitation.

Step 408 may further include various activities once the appointment time has been set by both parties. For example, calendar entries for each possible appointment time may be created as described above. As part of step 408, user app module 207 may be configured to delete all calendar entries for unselected appointment times. Further, if the appointment time that was selected had been marked as "tentative" earlier at the first remote device, the status of the appointment time may be changed to "confirmed" and the display of the calendar entry in the calendar may turn from yellow to green to indicate the change. The appointment time status at the second device may be changed to "confirmed" when the second user selects the appointment time, instead of waiting for confirmation from appointment negotiation system 104. User app module 207 may further be configured to synchronize with other calendar applications upon the completion of step 408.

Process 400 further includes synchronizing the appointment between the two remote devices (step 410). The synchronization allows a change made in the appointment by any user to be automatically applied to the appointment entry of each user, along with providing an accompanying message to the other users regarding the change. Step 410 may include synchronization with a calendar-based application of user app module 207 or any other calendar system (e.g., iCal, Google calendar, Outlook, etc.).

One-to-One Scheduling with Counter Offers

Figure 6:
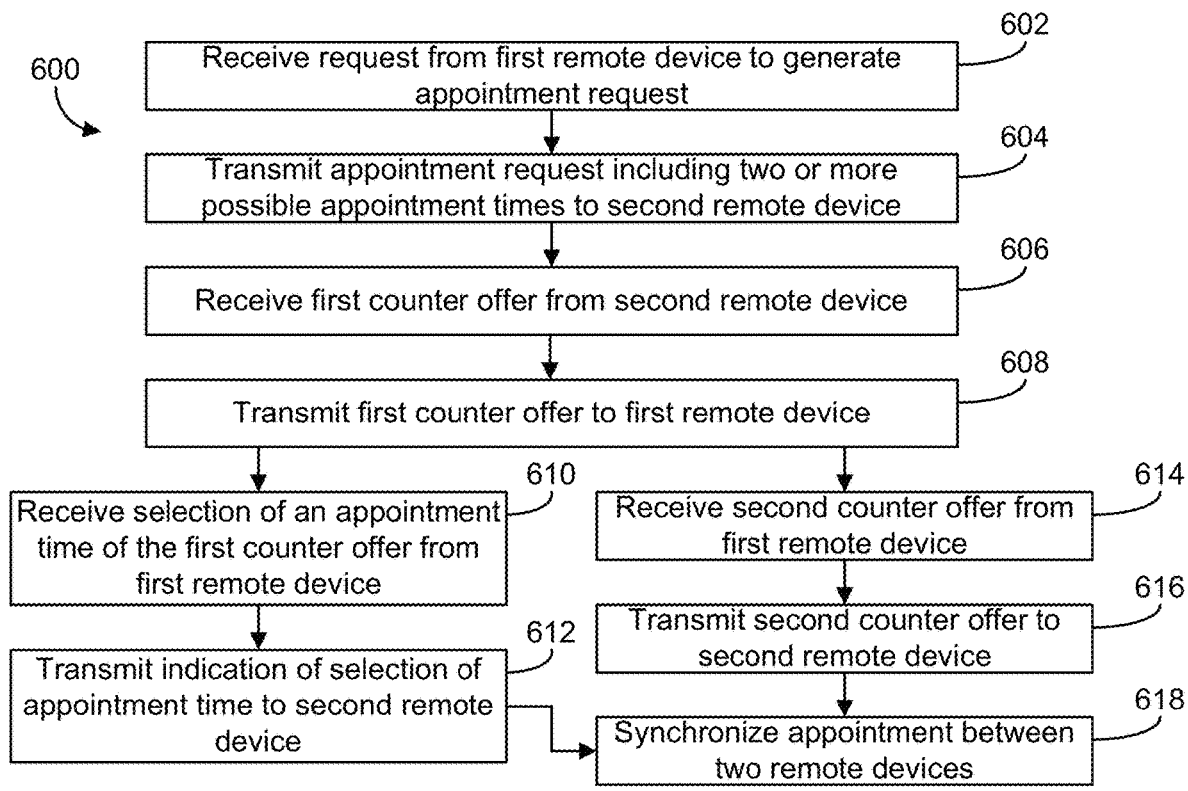
FIG. 6 is a flow chart of a process for one-to-one scheduling including counter offering, according to an exemplary embodiment.

Referring now to FIG. 6, a flow chart of a process 600 for one-to-one scheduling using the appointment negotiation service is shown, according to an exemplary embodiment. Compared to process 400, process 600 may be executed when the second user wishes to propose a counter offer. Process 600 may be executed by, for example, appointment negotiation system 104 for two users (a first user using a first remote device and a second user using a second remote device) attempting to set up an appointment.

Process 600 includes receiving a request from the first user of a first remote device to generate an appointment request (step 602) and transmitting the appointment request, including two or more possible appointment times to a second user of a second remote device (step 604). Instead of accepting or declining an appointment invitation, the second user may provide a counter offer. Process 600 further includes receiving a first counter offer from the second remote device (step 606). The counter offer may generally include a list of alternate appointment times to propose to the first user.

Figure 7A:
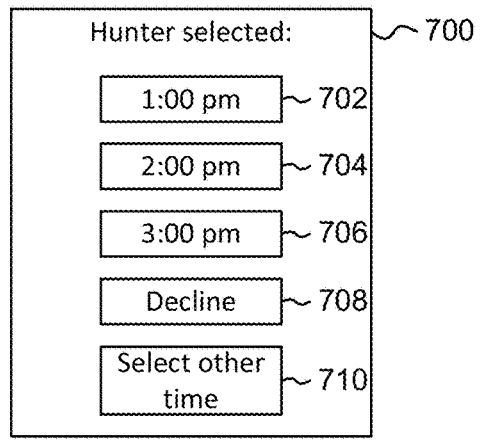
FIGS. 7A-D are illustrations of example user interfaces generated in the process of FIG. 6, according to an exemplary embodiment.
Figure 7B:
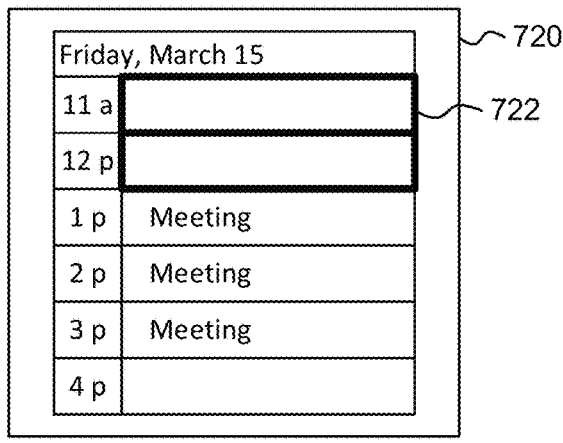
Figure 7C:
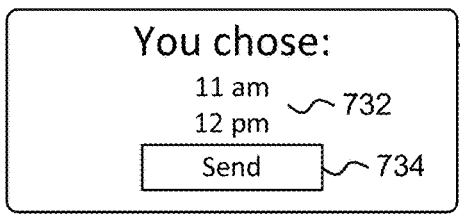

For example, referring to display 700 shown in FIG. 7A, the second user may be presented with a list of proposed appointment times 702, 704, 706, along with an option 708 to decline the appointment and an option 710 to select another time (e.g., to counter offer). Upon selecting option 710, the user may be presented with window 720 of FIG. 7B. Display 720 may display a calendar application, and the second user may select one or more times 722 from the calendar application. As shown in FIG. 7B, the second user's calendar indicates the user is booked during the proposed appointment times, so the user may select 11 AM and 12 PM as alternative times. Referring now to display 730 of FIG. 7C, the second user has chosen two alternative times 732 and may send the times via option 734 to appointment negotiation system 104 at step 606. Upon sending the counter offer, a user app module 207 may be configured to delete calendar entries that may have been created relating to the original appointment invitation.

Figure 7D:
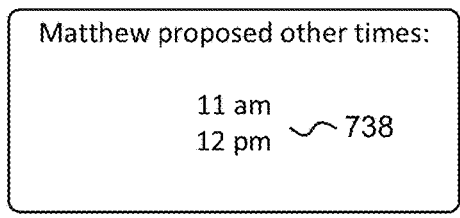

Process 600 further includes transmitting the first counter offer to the first user of the first remote device (step 608). An example display 736 is shown in FIG. 7D that may be presented to the first user. The first user may then select an appointment time from the counter offer or provide a second counter offer to the second user.

In one embodiment, the first user selects an appointment time from the counter offer. Process 600 includes receiving a selection of an appointment time of the first counter offer from the first remote device (step 610). Process 600 then includes transmitting an indication of selection of the appointment time to the second remote device (step 612). The activities of steps 610, 612 may generally be similar to the activities of steps 406, 408 of FIG. 4 relating to alerting users via push notification, updating the status of calendar entries, deleting unselected calendar entry times, synchronizing calendars, etc.

In one embodiment, the first user may instead provide a second counter offer, including alternative appointment times, to the second user. Process 600 includes receiving a second counter offer from the first user of the first remote device (step 614). Process 600 then includes transmitting the second counter offer to the second remote device (step 616). The first user and second user may continue to send each other counter offers until one user either accepts an appointment time of a counter offer or declines the invitation. When the process of counter offering is complete, the appointment may be synchronized for each remote device (618) as generally described with reference to step 410 of FIG. 4.

Process 600 describes an implementation of a counter offer process if both users have user app module 207. In one embodiment, if the second remote device does not have user app module 207, the second user may not be able to submit a counter offer. In another embodiment, the second user may submit a counter offer via a website, via text message, or via any other electronic medium available to the user.

It should be understood that the displays shown in FIGS. 7A-D are shown by example only, and may be only partial views of the displays that may be provided by user app module 207. For example, in FIGS. 7C-D, such displays may be displayed over a calendar application, allowing for the user to interact between the calendar and the displays. In other words, the appointment options as shown in FIGS. 7A-D are presented to the user within the context of the calendar application. Such a relationship is shown in greater detail in FIGS. 11-33.

Group Scheduling

Figure 8:
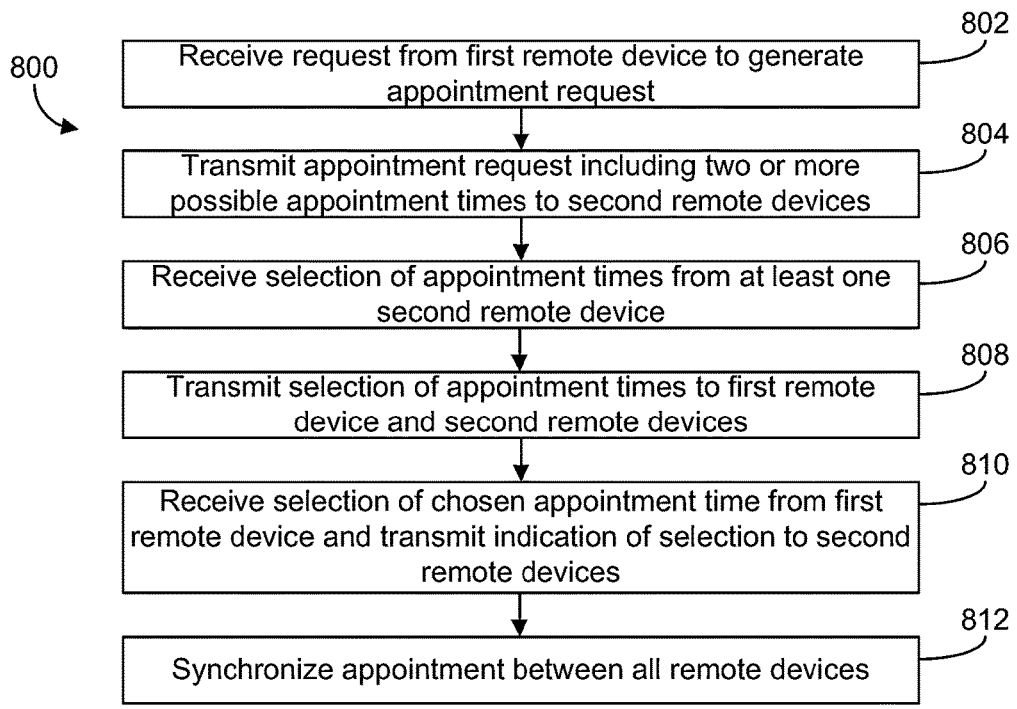
FIG. 8 is a flow chart of a process for group scheduling using the appointment negotiation service of the present disclosure, according to an exemplary embodiment.

Referring now to FIG. 8, a flow chart of a process 800 for group scheduling using the appointment negotiation service is shown, according to an exemplary embodiment. Process 800 may be executed when a first user wishes to create an appointment with multiple attendees. Process 800 may be executed by, for example, appointment negotiation system 104 for multiple users (a first user using a first remote device and at least two second users using second remote devices) attempting to set up an appointment. While process 800 described a process for group scheduling, it should be understood that elements as described with reference to one-to-one scheduling (particularly about push notifications, creating calendar entries via user app module 207, etc.) may be executed as part of process 800 at each individual remote device.

Process 800 includes receiving a request from the first user of the first remote device to generate an appointment request (step 802). Step 802 may be similar to, for example, step 402 of process 400 with regards to setting up an appointment. For example, also referring to FIG. 5A, the first user may simply select multiple users 514, 518 instead of a single user, and appointment negotiation system 104 may be able to receive the appointment information and to determine whether the appointment is a one-to-one appointment or a group appointment.

Figures 9A, 9B, 9C:
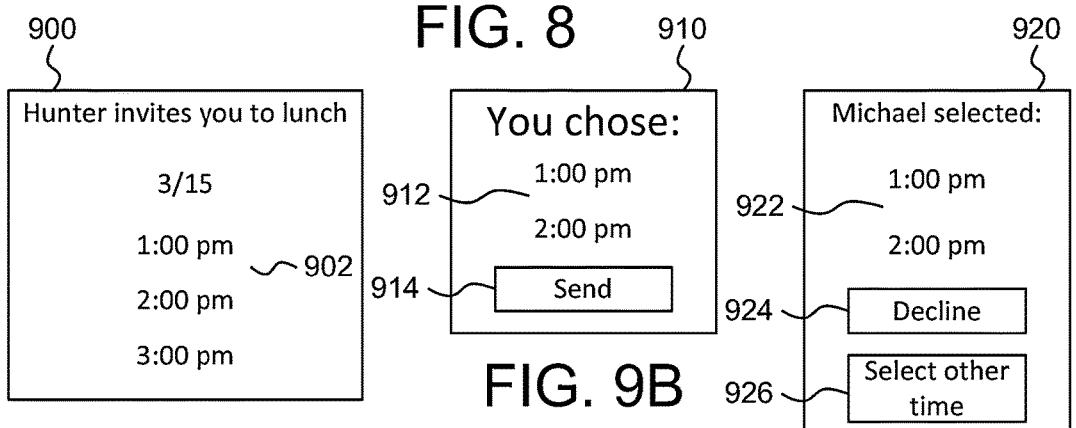
FIGS. 9A-F are illustrations of example user interfaces generated in the process of FIG. 8, according to an exemplary embodiment.

Process 800 further includes transmitting the appointment request, including two or more possible appointment times, to the second users of the second remote devices (step 804). If the user does not have user app module 207 on his or her remote device, the user may receive a text message or email as described with reference to FIGS. 4 and 5B. If the user does have user app module 207, the user may be sent a push notification such as a display 900 shown in FIG. 9A. Display 900 may simply indicate that the user has been invited to an appointment, and indicates three (or a different number) of possible appointment times for selection. The transmission of the appointment request may be provided in the same manner as described with reference to process 400 of FIG. 4. For example, for each second user with user app module 207 on his or her remote device, step 804 may include generating calendar entries on the user application for each of the appointment times.

A first user may wish to invite more second users to the appointment after the initial invitation is sent at step 804, or one or more second users may wish to forward the invitation to other users. If so, the invitation may be sent to other users after step 804, as long as the final appointment time for the appointment has not been finalized or selected by the first user. In one embodiment, a first user may send the invitation to additional second users at his or her choosing. In another embodiment, a second user may send the invitation to an additional second user. The second user may or may not seek permission from the first user to send the invitation to an additional second user. The appointment negotiation server may be configured to receive all such invitations after the execution of step 804 and to update the first remote device and each second remote device with information about each user as described below.

Process 800 further includes receiving a selection of appointment times from at least one second user of the second remote devices (step 806). For example, referring also to display 910 of FIG. 9B, a second user is shown selecting two possible times (1 PM, 2 PM) for the appointment, that may be sent to appointment negotiation system 104 by pressing button 914.

Step 808 may include various sub-steps as part of the process of selecting appointment times. In one embodiment, the user may simply select appointment times that fit the user's schedule (which may be zero, one, two, or more appointment times), and transmit the selection back to appointment negotiation system 104.

In another embodiment, the user may vote or assign a value to each option. For example, the user may rank the appointment times from most desirable to least desirable. As another example, the user may vote on each individual appointment time. The user may indicate, for each appointment time, if the time is "ideal," "okay," "not okay" (e.g., the user cannot make the appointment), or any other status to associate with the appointment time.

In one embodiment, the plurality of second remote devices may continue to receive push notifications, or other information, from appointment negotiation system 104 at step 806. For example, each time a second user transmits a selection to system 104, system 104 may in response transmit the selection to the other second remote devices, updating a status of the appointment invitation. For example, referring to display 920 of FIG. 9C, a second user is shown receiving an indication that another second user has selected two times 922. The user may select a time via button 926, decline the invitation via button 924, or perform any other action related to the appointment invitation.

In one embodiment, if a second user is unable to make the appointment at any of the given appointment times, the user may provide a counter offer with additional appointment times. As compared to process 600 of FIG. 6, however, since there are other second users with whom the first user is negotiating with, the proposed additional appointment times may or may not be sent to other second users. The additional appointment times may, however, be placed as a calendar entry via user app module 207.

Process 800 further includes transmitting a selection of appointment times to the first user of the first remote device and the plurality of second remote devices (step 808). In one embodiment, each user may receive a selection of an individual second user after the user makes the selection. In another embodiment, step 808 may include waiting until all second users have responded, and sending an aggregate response to the all users. In yet another embodiment, step 808 may include waiting until a majority or set percentage of second users have responded, may include waiting until one or more "important" users have responded, or otherwise.

If a first user receives second user selections one at a time, the first user may select an appointment time to confirm, or may simply continue to wait for more responses. If the first user receives all second user selections at once, the first user may then be prompted to select an appointment time. In one embodiment, appointment negotiation system 104 may aggregate all information in a table or chart, allowing the first user to view all appointment time information. In another embodiment, appointment negotiation system 104 may suggest one or more appointment times that fits everyone's schedule or fits the most schedules. If the user receives only a plurality, but not all, of second user selections, appointment negotiation system 104 may indicate which second users have yet to respond, if a majority consensus on an appointment time has been reached, if a particular appointment time can be ruled out, or if various counter offer appointment times are lining up, indicating to the first user (e.g., organizer) that the appointment times should be included in a subsequent round of counter offers, etc.

In one embodiment, the second user selections may include feedback relating to each appointment time that was proposed. Referring to display 930 of FIG. 9D, a second user may specify, for each proposed appointment time, a preference. For example, in FIG. 9D, the second user may specify for appointment time 932 that the time is ideal (represented by two checkmarks), that appointment time 934 is okay (represented by one checkmark), and that appointment time 936 is not okay (represented by an X).

Figures 9D, 9E, 9F:
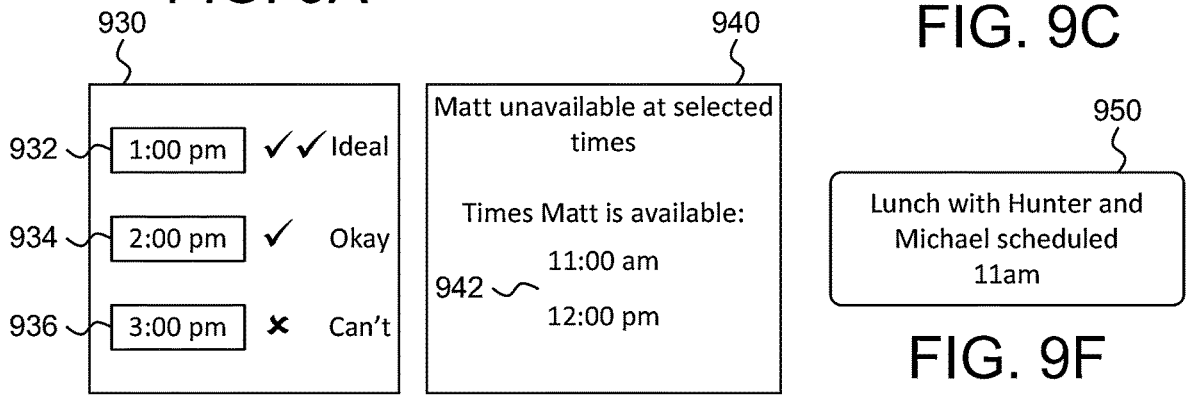

As one example, the first user may receive a push notification via display 940 of FIG. 9E, indicating that a second user is unavailable for the appointment at the selected times. The push notification may also indicate if the second user has included one or more counter offer appointment times. The first user may receive such a notification once the second user has made the indication, or may be provided as one of a number of responses provided at step 808 at once. The first user may then decide to either ignore the suggestion, create a counter offer with new proposed appointment times, or create an addition to the current appointment invitation with the new appointment times. The new or revised appointment invitations may then be sent out to the plurality of second users.

The first user may eventually select a single appointment time for the appointment. Process 800 may include receiving the selection, and transmitting an indication of the selection of the appointment time to the plurality of second remote devices (step 810). For example, step 810 may include sending a push notification such as that shown in display 950 of FIG. 9F. Step 810 may further include various activities related to user app module 207 operation. For example, user app module 207 may receive the notification and update and synchronize with a calendar application of the remote device, may delete unused appointment times from the calendar, etc.

Process 800 further includes synchronizing the appointment with each remote device (step 812). For example, if a second user later cancels his or her appointment, all other users may be notified and the calendar entry for each user may be updated. As another example, if a first user changes the appointment details, all second users may be notified and the calendar entry updated.

Appointment Negotiation Server

Figure 10:
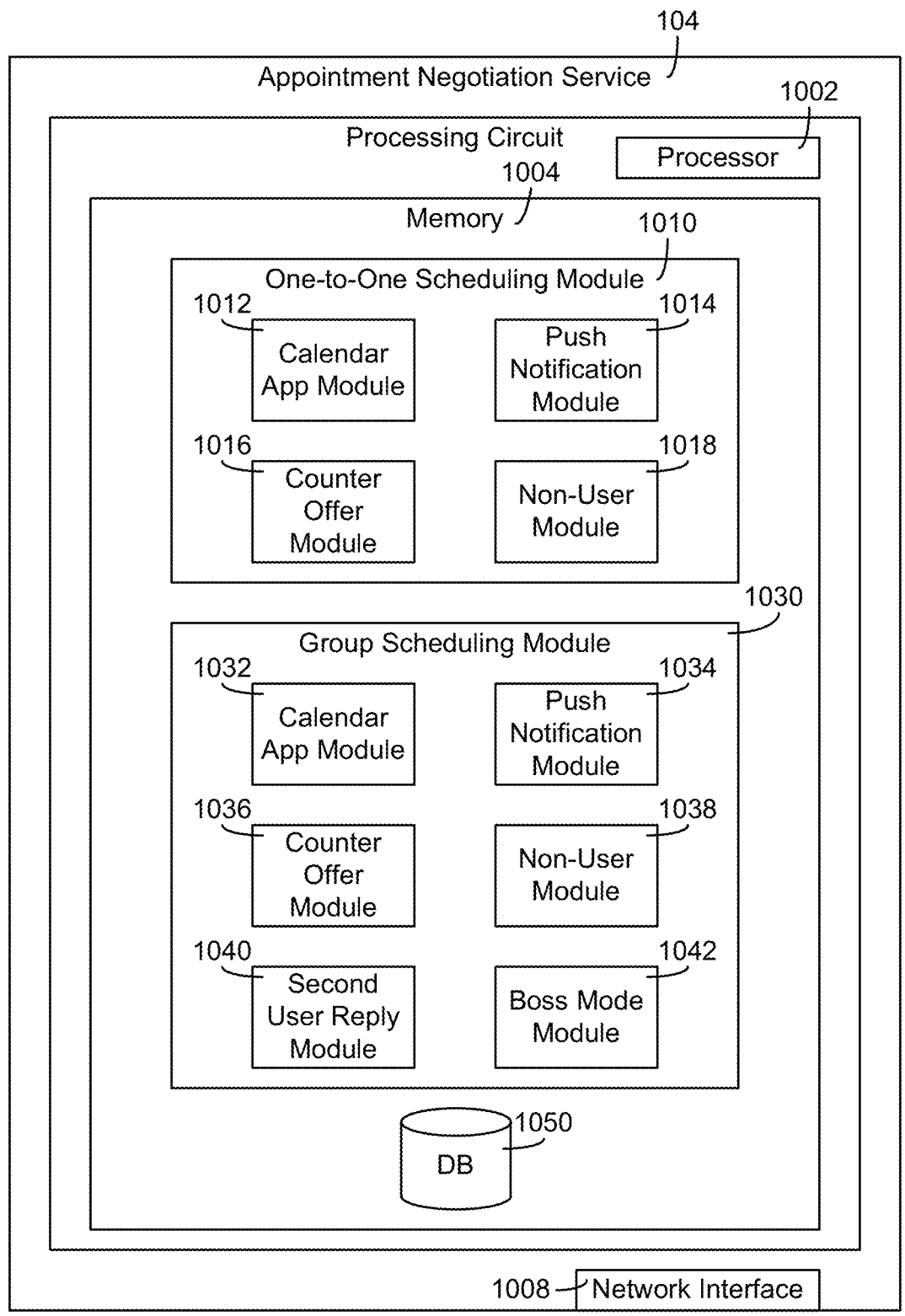
FIG. 10 is a block diagram of the scheduling service module of FIG. 1, according to an exemplary embodiment.

Referring now to FIG. 10, appointment negotiation system 104 is described in greater detail. Appointment negotiation system 104 may be configured to execute the systems and methods described herein, particularly processes 400, 600, 800. The possible variations on one-to-one scheduling and group scheduling methods as described in processes 400, 600, 800 may be implemented by appointment negotiation system 104 as additional or alternative steps in processes 400, 600, 800, according to varying embodiments of the present disclosure.

Appointment negotiation system 104 includes a processing circuit 1002 including a processor 1004 and memory 1006. Processor 1002 may be implemented as a general purpose processor, an application specific integrated circuit (ASIC), one or more field programmable gate arrays (FPGAs), a group of processing components, or other suitable electronic processing components. Memory 1004 is one or more devices (e.g., RAM, ROM, flash memory, hard disk storage, etc.) for storing data and/or computer code for completing and/or facilitating the various user or client processes, layers, and modules described in the present disclosure. Memory 1004 may be or include volatile memory or non-volatile memory. Memory 1004 may include database components, object code components, script components, or any other type of information structure for supporting the various activities and information structures of the present disclosure. Memory 1004 is communicably connected to processor 1002 and includes computer code or instruction modules for executing one or more processes described herein. Appointment negotiation system 104 further includes a network interface 1008 for wirelessly communicating with one or more remote devices.

With respect to the description below, "first user" and "first remote device" relates to a user creating an appointment invitation, and "second user" and "second remote device" relates to one or more users being invited to an appointment by the first user.

Memory 1004 may include a one-to-one scheduling module 1010 and group scheduling module 1030. Modules 1010, 1030 may be configured to handle one-to-one scheduling and group scheduling services of service 104, respectively. Memory 1004 may receive an initial first user input from a first remote device. Memory 1004 may determine whether the initial user input relates to an appointment invitation including one other user or multiple users, and may determine the correct module 1010, 1030 to use.

One-to-one scheduling module 1010 is shown to include a calendar app module 1012. Calendar app module 1012 may be configured to provide a user app module of a remote device (e.g., user app module 207 of remote device 102) with calendar application data. The calendar application data may be used by the user app module to generate a user interface for a user of the remote device that displays calendar-related information. For example, the calendar application data may include a title and description for a proposed appointment, all proposed appointment times, the person sending the invitation, the location of the appointment, if the appointment is recurring, etc. Module 1012 may send calendar application data such that the user app module may create a calendar entry for each proposed appointment time. Each calendar entry may be marked as "tentative" (and marked, shaded yellow, or otherwise distinguished as such in the app) until the corresponding appointment time is confirmed or denied. In one embodiment, calendar app module 1012 generates calendar application data for the second remote device while the user app module of the first remote device may create calendar application data based on the initial invitation. In another embodiment, calendar app module 1012 may generate calendar application data for both remote devices.

When appointment negotiation system 104 receives an acceptance of an appointment time or denial from either remote device, calendar app module 1012 may be configured to send the appropriate calendar application data to update calendar entries (e.g., to remove calendar entries for unselected times, to change statuses from "tentative" to "confirmed," etc.).

Module 1010 further includes push notification module 1014. Push notification module 1014 may be configured to generate a push notification that appears on a remote device of a user. For example, the push notification may simply be a window including a message indicating that a first user has invited the second user to an appointment. As another example, the push notification may be a window including a message that a second user has accepted, declined, or counter-offered an appointment invitation. The push notification may include any number of input fields (e.g., selectable buttons) that allows the user to select appointment times, accept or decline invitations, and the like.

Module 1010 further includes counter offer module 1016, which may be configured to manage a counter offer of a first user or second user. For example, when a second user makes a counter offer to an appointment invitation, module 1016 may receive the request and corresponding information (e.g., a message from the second user, proposed appointment times, etc.). Module 1016 may be configured to provide the information to calendar app module 1012 so that module 1012 may update calendar entries of both users, and to push notification module 1014 to send a push notification to the first user. As another example, module 1016 may manage a second counter offer from the first user in a similar manner.

Module 1010 further includes a non-user module 1018. Non-user module 1018 may be configured to handle communication with a second remote device that does not include a user app module. Non-user module 1018 may be configured to receive an appointment invitation from the first user and to generate a text message, email, or other message to send to the second user. For example, the message may be a text message that the second user can reply to in order to accept or decline an appointment invitation, along with selecting an appointment time. As another example, the message may be an email with a link to a website. The website may then include a user interface that allows the second user to accept or decline an appointment invitation, along with selecting an appointment time. The email may also include a link to download a user application that may execute or install the user app module on the remote device of the user.

Group scheduling module 1030 is shown to include a calendar app module 1032. Calendar app module 1032 may have functionality similar to calendar app module 1012, but may serve a plurality of second remote devices instead of a single remote device. Therefore, calendar app module 1032 may be additionally configured to send calendar application data for other second users of second remote devices.

For example, when a second user provides an input relating to the appointment invitation, the input may relate to user availability for each of the appointment times. Calendar app module 1032 may be configured to send an update to each of the second users relating to the user availability. For example, if one user indicates that he or she cannot make an appointment for a given appointment time, the information may be sent to other users so that they can see that the user cannot make the given appointment time. In one embodiment, calendar app module 1032 may be configured to send such updates each time a user provides information, at regular given intervals, or on any other type of schedule.

Module 1030 further includes a push notification module 1034. Push notification module 1034 may be configured to generate a push notification that appears on a remote device of a user. For example, the push notification may simply be a window including a message indicating that a first user has invited multiple second users to an appointment. As another example, the push notification may be a window including a message that a second user has responded to the appointment invitation by indicating preferences to each appointment time. The push notification may include any number of input fields (e.g., selectable buttons) that allows the user to select appointment time preferences, decline invitations, and the like. In one embodiment, push notification module 1034 may provide a push notification to each user after a single user responds to the appointment invitation. In another embodiment, push notification module 1034 may provide push notifications at scheduled intervals instead, or on any other timetable, such that the plurality of second users do not receive continuous updates.

Module 1030 further includes a counter offer module 1036. Counter offer module 1036 may be configured to manage a counter offer of a second user. For example, when a second user makes a counter offer to an appointment invitation, module 1036 may receive the request and corresponding information (e.g., a message from the second user, proposed appointment times, etc.). Module 1036 may be configured to provide the information to the first user, and the first user may ignore or respond to the counter offer accordingly.

Module 1030 further includes a non-user module 1038. One or more of the second users may use a remote device without a user app module. Non-user module 1038 may be configured to handle communication with a second remote device that does not include a user app module. Non-user module 1038 may be configured to receive an appointment invitation from the first user and to generate a text message, email, or other message to send to a second user. For example, the message may be a text message that the second user can reply to in order to vote on or rank appointment times of the appointment invitation. As another example, the message may be an email with a link to a website. The website may then include a user interface that allows the second user to vote on or rank appointment times of the appointment invitation, make counter offers, etc.

Module 1030 further includes second user reply module 1040. Module 1040 may be configured to receive the various user replies and to analyze and sort the data. For example, each user may provide, for each proposed appointment time, an indication that the time is ideal for the user, that the time is okay for the user, that the time is not good for the user, or another indication. Module 1040 may receive the indication for each appointment time. Module 1040 may further aggregate the indications to determine a most ideal appointment time, an appointment time that should be discarded, and so forth. Module 1040 may, in one embodiment, assemble the various indications into a table format for presenting to a first user and plurality of second users. Module 1040 may also organize various counter offers in various ways to offer the first user more appropriate counter offer options to offer the other users in the group. For example, if three other users have indicated a common counter offer appointment time, module 1040 may indicate the appointment time to the first user and suggest the first user incorporate the appointment time in a counter offer to the group of users.

As another example, each user may rank each proposed appointment time from best to worst, and module 1040 may be configured to aggregate the votes to determine an average ranking or a most desired appointment time.

Module 1030 further includes boss mode module 1042. In one embodiment, during group scheduling, a first user may send invites to a plurality of second users, but one or more of the second users may have higher priority than the other users (e.g., they may be bosses or supervisors, essential personnel for the appointment, etc.). Boss mode module 1042 may be configured to receive a response from the higher priority users and determine when an update should be sent to the first user and/or other less important second users. For example, a supervisor may respond to an appointment invitation by indicating his or her preferred appointment times. Boss mode module 1042 may receive the supervisor input and determine that one or more appointment times that conflict with the supervisor should be removed, that a particular appointment time should be chosen by the first user based on the supervisor input, etc. In one embodiment, the supervisor may override other users' decisions and set an appointment time himself or herself, and boss mode module 1042 may be configured to alert the other modules of module 1030. In another embodiment, the supervisor may receive the appointment invitation before the other invitees receive the invitation. The supervisor may approve the appointment invitation for sending to other users, the supervisor may edit the appointment times, approve or delete individual appointment times, or may otherwise edit, approve, or disapprove any aspect of the appointment invitation before the invitation is sent to the other second users.

Appointment negotiation system 104 and memory 1004 is shown to further include a database 1050. Database 1050 may be configured to store data related to the appointments and users. For example, database 1050, for a group scheduling process, may be configured to store the votes of each second user (e.g., a status for each appointment time submitted by each user), a timestamp indicating when the second users voted, and other second user data to be transmitted to a first user data before the first user selects an appointment time. Database 1050 may further store an indication if a second user has viewed or responded to the appointment invitation yet. Database 1050 may be configured to store all data that may be transmitted to and from appointment negotiation system 104 as described with reference to modules 1010, 1030, and their sub-modules.

It should be understood that while various modules are shown in appointment negotiation system 104, one or more of the modules may additionally or alternatively be a part of user app module 207 of a remote device 102, such that the activities described may be performed by the remote device instead of appointment negotiation system 104.

In the embodiments of FIGS. 4-10, a first remote device is generally described as a mobile device, while the second remote devices may be mobile devices or non-mobile devices. In another embodiment, the first remote device may be a non-mobile device, and the first remote device may include a user app module configured to handle the activities described herein.

User Interfaces

Referring generally to FIGS. 11-32, various example user interfaces are shown and described. The user interfaces of FIGS. 11-32 may be generated by a user app module that receives appointment information from an appointment negotiation service. The user interfaces of FIGS. 11-32 are provided as example user interfaces and are not intended to be limiting the possible configurations and presentation of the appointment information as shown.

Figure 11:
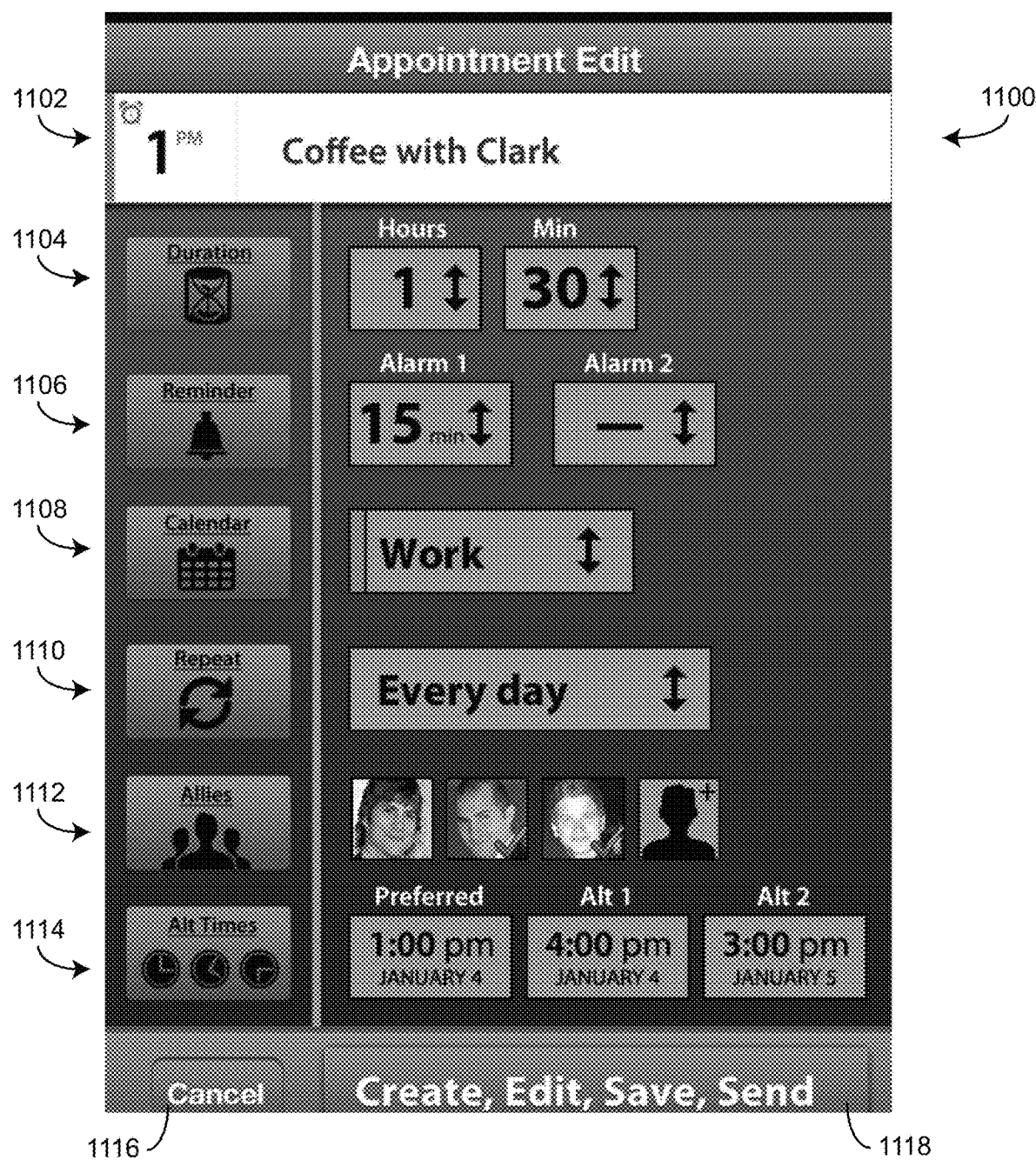
FIGS. 11-33 are further example of user interfaces generated by the scheduling service module of FIG. 1, according to an exemplary embodiment.

Referring to FIG. 11, user interface 1100 may be used by a first user of a first remote device (e.g., an inviter) to create or edit an appointment. The user may access user interface 1100 when first creating a meeting, or editing an existing meeting. The user is provided with various fields on user interface 1100 related to the appointment. The user may change a name or title for the appointment in field 1102. The user may change a duration (e.g., how long the appointment will last) using fields 1104. The user may set one or more alarms using fields 1106 that will remind one or all users about the appointment beforehand (e.g., 15 minutes before the appointment as shown in FIG. 11). The user may specify a type of appointment in field 1108. For example, the user may specify that the appointment is casual, is a work meeting, is a social gathering, phone call, online presentation, etc. The user may further specify how to categorize the appointment, or which of the users' calendars to write the appointment into (by category or by calendar application, etc.) using field 1108. The user may specify is the appointment should be recurring using field 1110 (e.g., if the meeting occurs every day, every week, every month, every year, etc.). The user may specify who is invited to the appointment using field 1112. The user may specify the three (or other number) of appointment times to present to the other users being invited to the appointment using fields 1114. For example, three times are illustrated as being proposed in user interface 1100. The user may cancel the creation or editing of the appointment via button 1116, and may create, edit, save, and/or send the appointment using button 1118.

Figure 12:
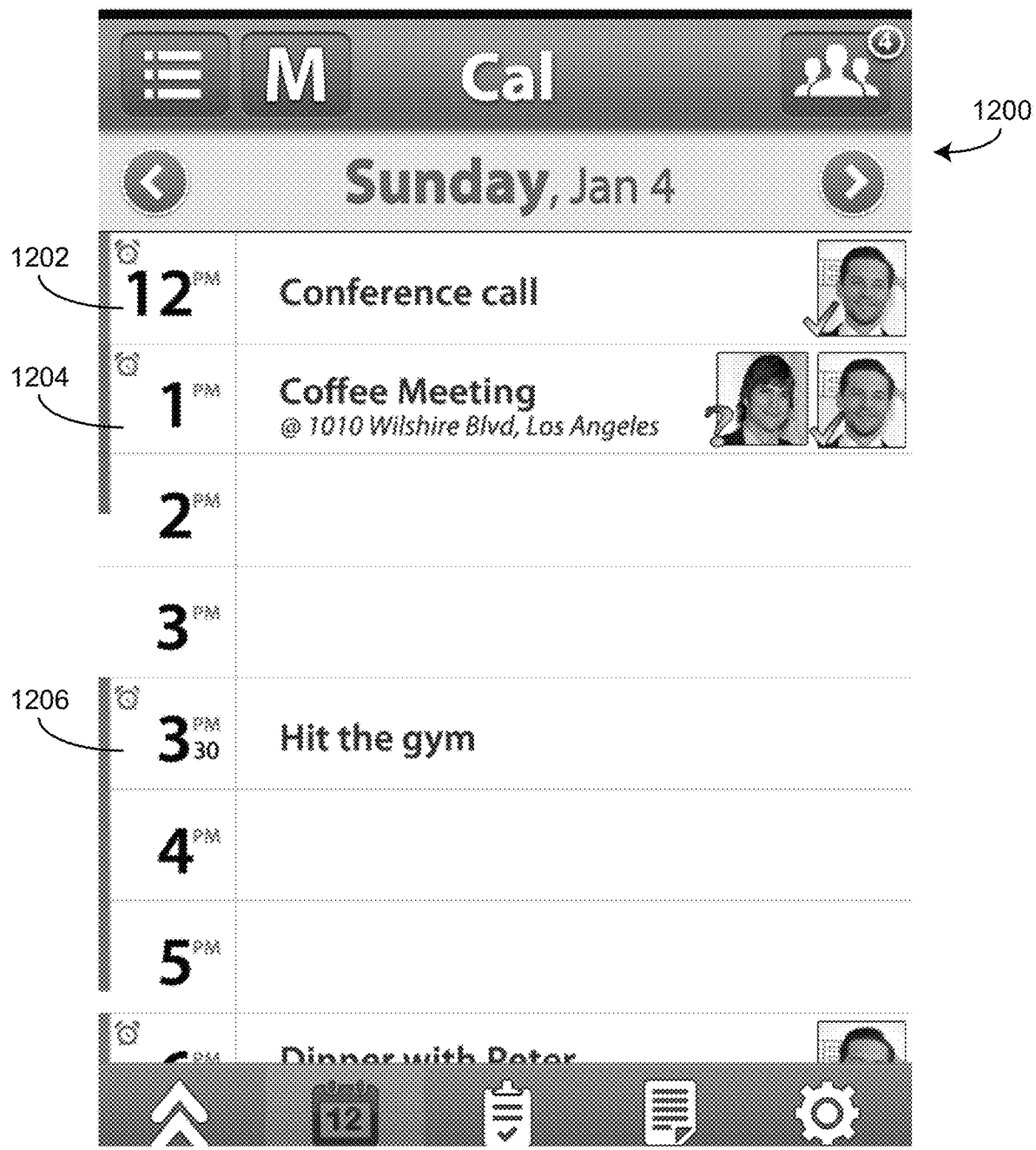

Referring to FIG. 12, user interface 1200 may be a calendar interface generated by a user app module using retrieved calendar data. User interface 1200 includes multiple appointments 1202, 1204, 1206. The appointment information shown with appointments 1202, 1204, 1206 may include the other users invited to the appointment, a status of each user (e.g., a question mark indicates the user is tentatively joining and the checkmark indicates the user has verified he or she will attend), a name and meeting location of the appointment, or other information. In one embodiment, each meeting may be color coded such that the user may identify the type of appointment (e.g., work, social, etc.) or which third party calendar service the appointment will be written to. User interface 1200 is an example user interface that may be generated when a user wishes to view his or her calendar.

Figure 13:
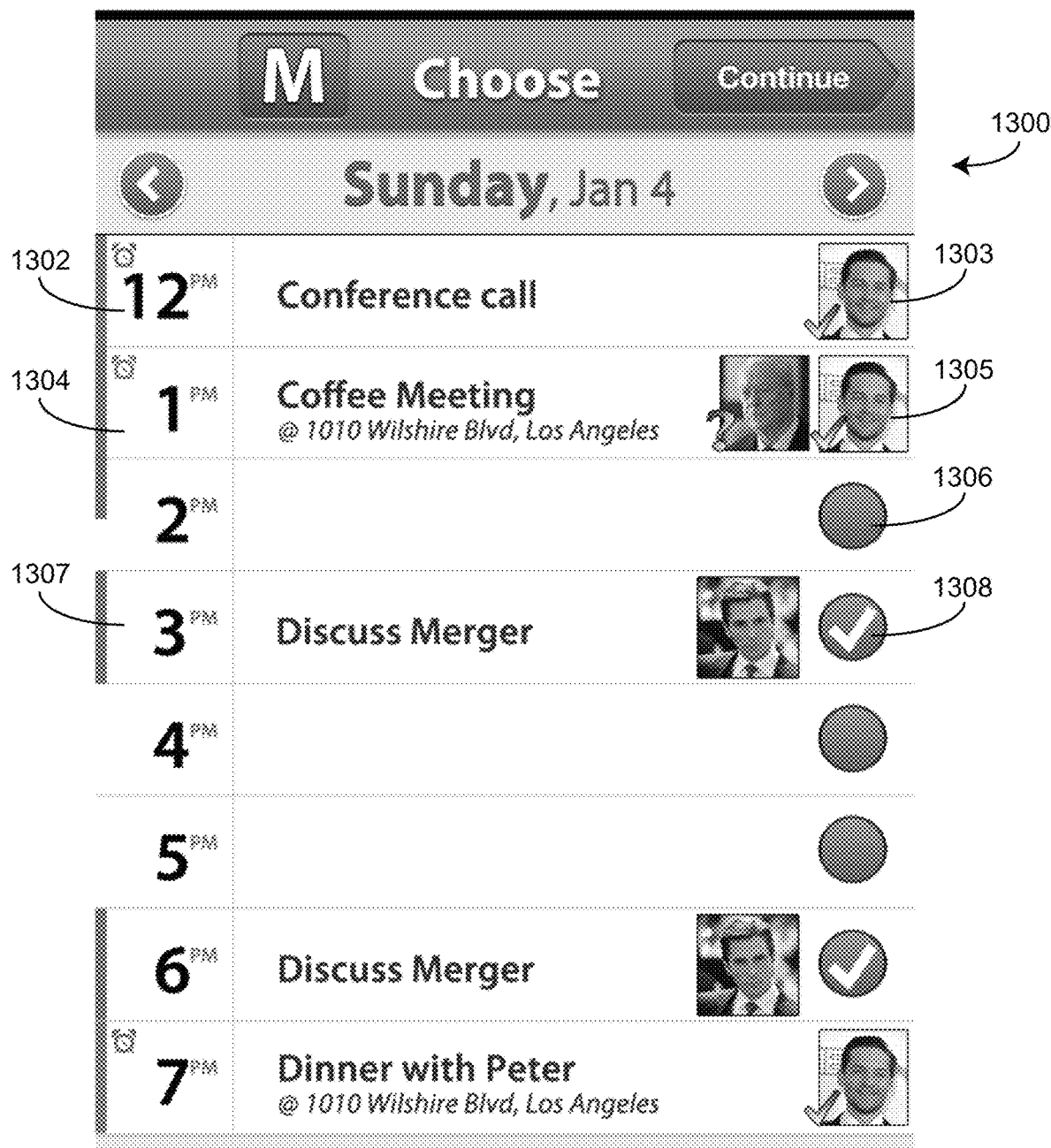

Referring to FIG. 13, user interface 1300 is another calendar interface that may be generated by a user app module using retrieved calendar data. User interface 1300 includes multiple appointments 1202, 1204, 1206 displaying the same information as described with reference to FIG. 12. However, in addition, other user interface elements are shown. Element 1306 is shown in a blank space in the user's schedule. Element 1306 may indicate to the user that this particular time period (2 PM in the example of FIG. 13) is open and that the user may schedule another appointment in the time slot without interfering with other appointments. Element 1308 is also shown within appointment 1307. Element 1308 may indicate to the user that this particular time period (3 PM in FIG. 13) was originally open for the user but has been selected by the user as a possible time for a one-to-one or group appointment. Elements 1306, 1308 may be color coded to indicate a particular status. For example, elements 1306, 1308 may be color coded to represent that the time if available or empty, indicating to the user that the time is available for the appointment. In other embodiments, elements 1306, 1308 may indicate the times are part of the user's work schedule, that the time is not part of the user's work schedule, or otherwise. This may assist the user in decision-making when it comes to choosing appointment times.

Figure 14:

Referring to FIG. 14, user interface 1400 is another calendar interface that displays a calendar. User interface 1400 may allow the user to navigate in between dates while in the appointment negotiation process. Dates 1402, 1404 are shown as color coded dates, which may generally represent availability and other properties. A user may view interface 1400 to see which days he or she is scheduled for an appointment.

Figure 15:
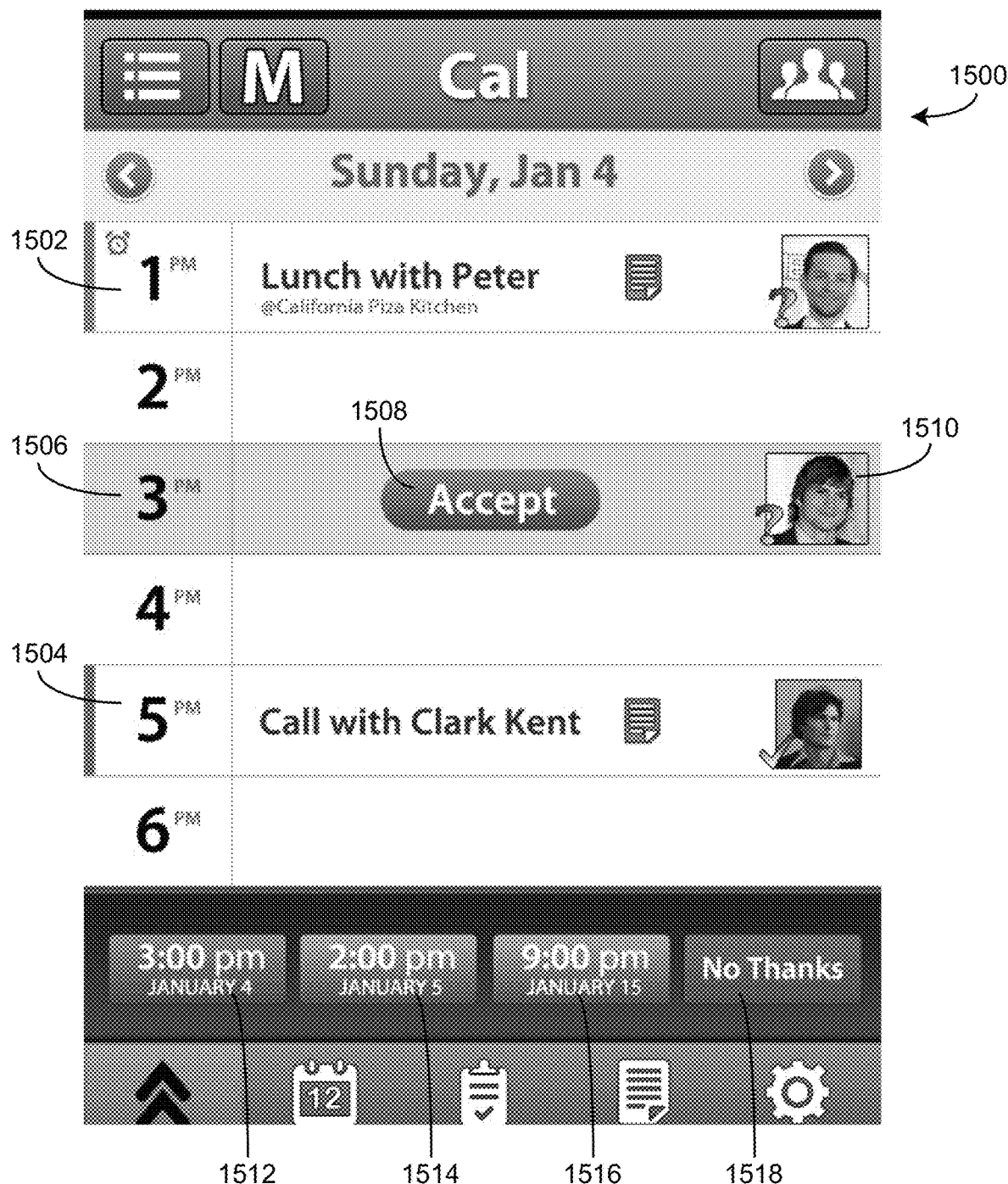

Referring to FIG. 15, user interface 1500 is another calendar interface displaying three appointments 1502, 1504, 1506. User interface 1500 may be displayed on a second remote device. The second remote device may receive an invitation to an appointment, shown as appointment 1506. Appointment 1506 is shown as shaded in user interface 1500, indicating the appointment as tentative. Appointment 1506 includes an accept button 1508 that will accept the appointment at the given time (3 PM) if selected. Appointment 1506 also includes the one or more other users 1510, along with an indicator of how many users are invited and/or how many users have replied, and may include other appointment information.

In addition to presenting the appointment in field 1506, alternative times for the appointment may be displayed at the bottom of user interface 1500. The user may select the first time 1512 of 3 PM, the second time 1514 of 2 PM on another day, or a third time 1516 of 9 PM on a third day. When the user selects one of times 1512, 1514, 1516, the calendar may automatically shift appointment 1506 displayed above into the new time slot on the calendar. For example, as shown, the user may have selected time 1512. User interface 1500 further includes a cancel button 1518 that allows the user to cancel or decline the appointment.

Figure 16:
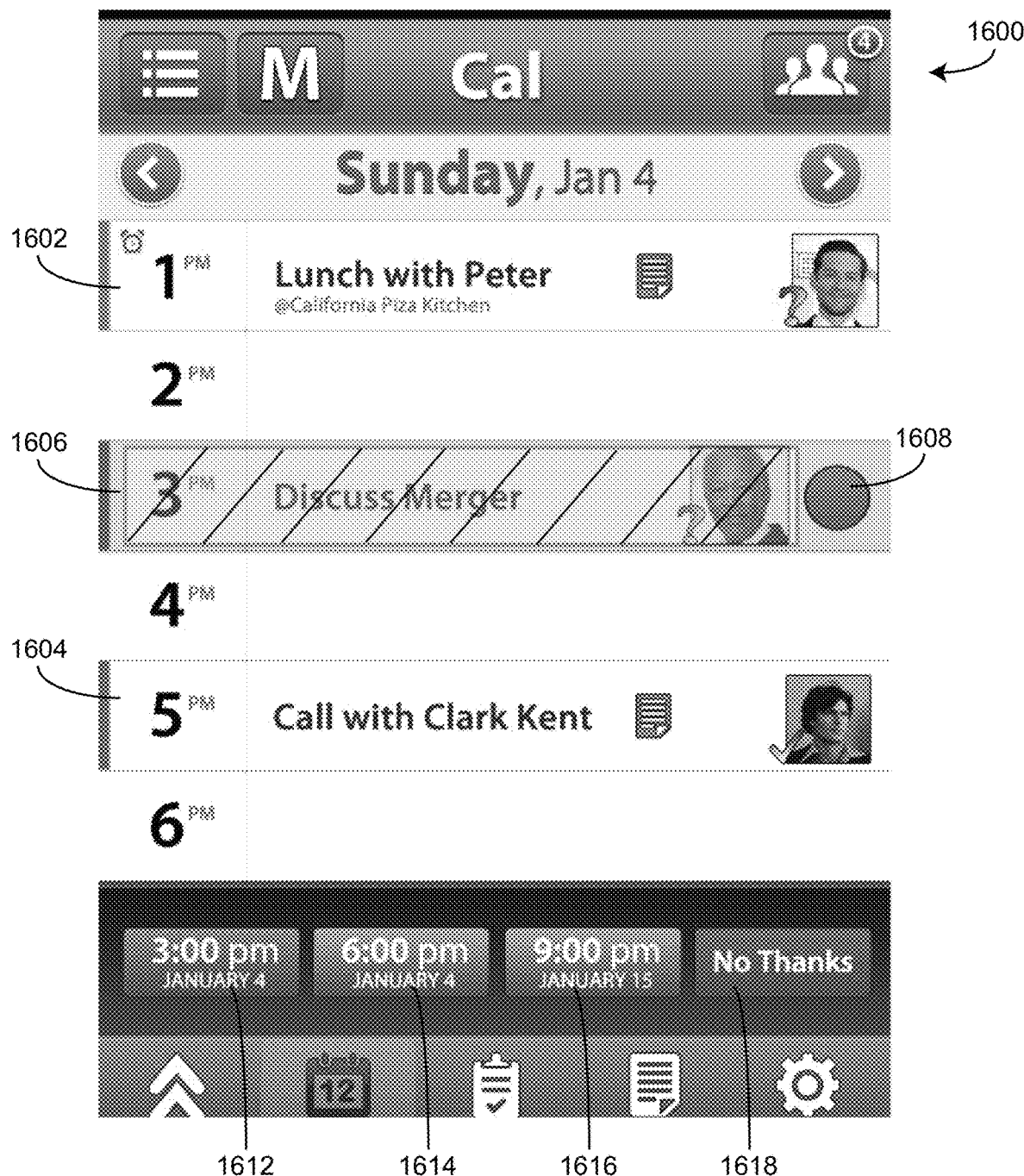

Referring to FIG. 16, user interface 1600 is another calendar interface displaying three appointments 1602, 1604, 1606. User interface 1600 may be displayed on a second remote device. The second remote device may receive an invitation to an appointment, shown as appointment 1606. Appointment 1606 is shown as shaded in user interface 1600, indicating the appointment as tentative. Appointment 1506 includes an element 1608 that may designate the particular time (3 PM in FIG. 16) as busy, open, a working time, or any other type of designation. Use interface 1600 further includes times 1612, 1614, 1616 and button 1618, which have the same functionality as described with reference to times 1512, 1514, 1516, and button 1518 of FIG. 15.

Figure 17:

Referring to FIG. 17, an example invite list is shown in user interface 1700. When a first user is first setting up an appointment, the user may select invitees from a list of friends via button 1702, via a list of other users who have the same user app module via button 1704, or any other list of users including but not limited to contact from the user's device. The user may select button 1706 to send out the invites to selected users.

One user 1708 is shown with a checkmarked element 1710, indicating the user has been selected. Another user 1712 is shown with an invite button 1714 that the user may press to select user 1712.

Figure 18:
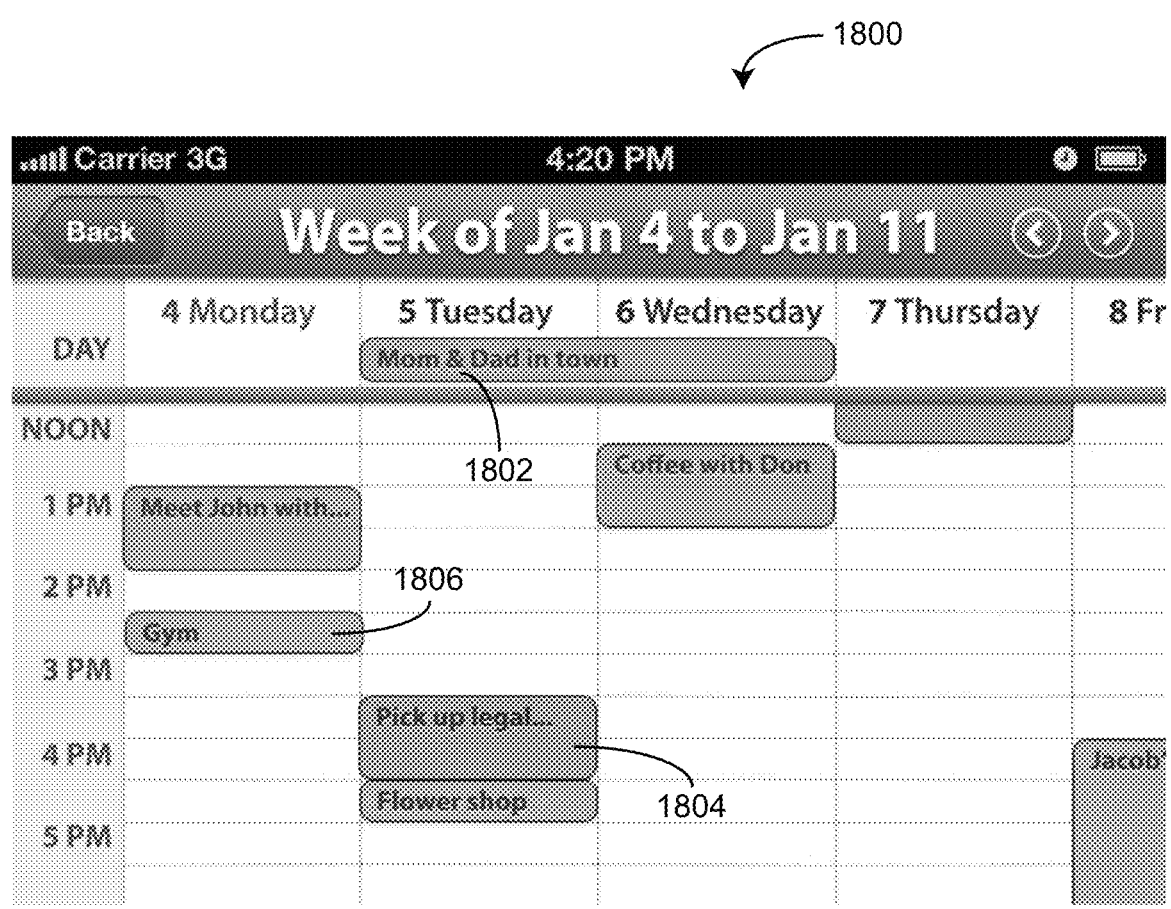

Referring to FIG. 18, user interface 1800 displays another calendar application. User interface is shown to include a weekly view, and illustrates various appointments. The appointments may be color coded, according to various embodiments. For example, appointment 1802 may be shaded blue to indicate a social appointment. Appointment 1804 may be shaded green to indicate a work-related appointment. Appointment 1806 may be shaded red to indicate a personal appointment.

Figure 19:
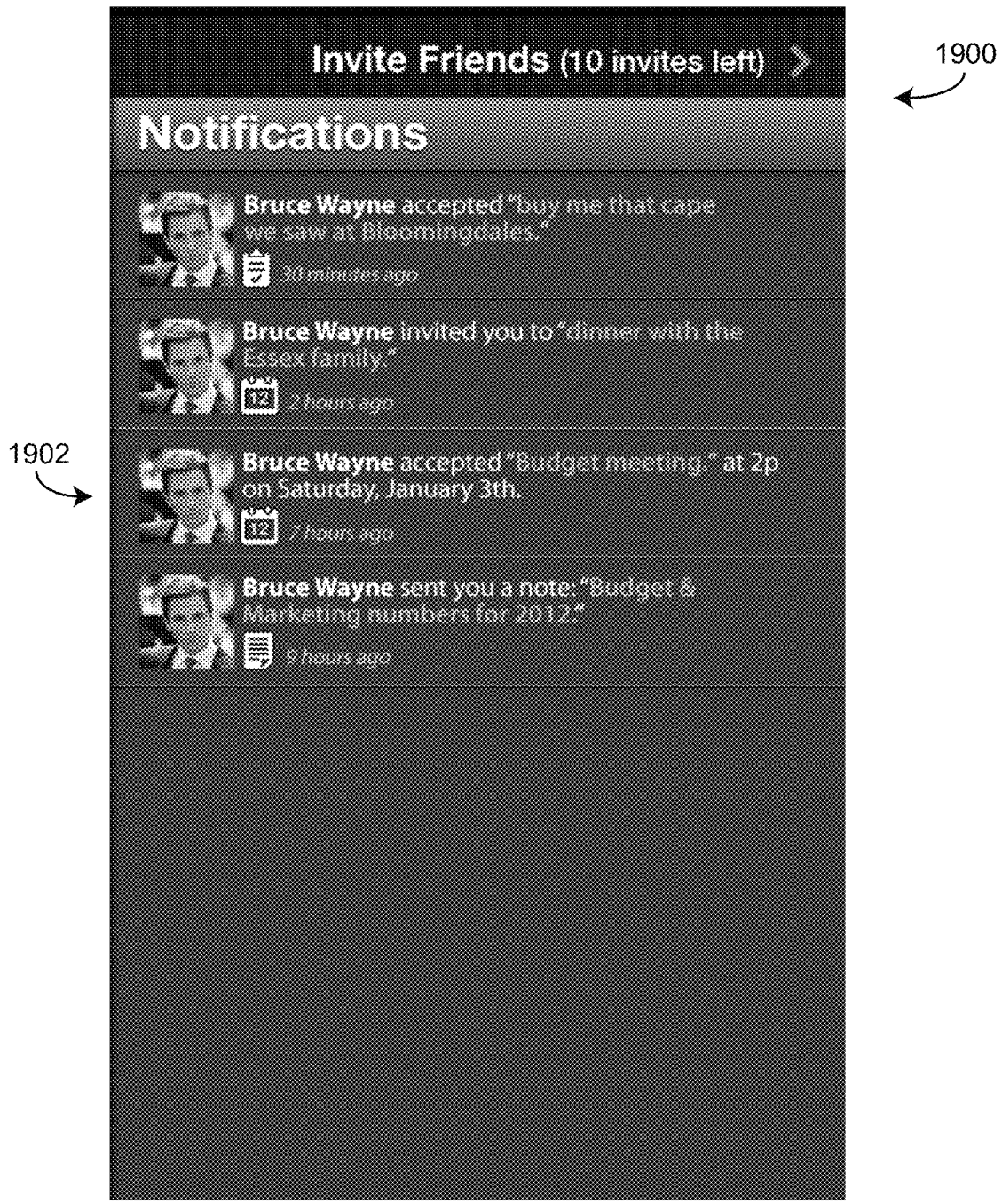

Referring to FIG. 19, user interface 1900 illustrates a notification list. When a second user responds to an appointment invite, user interface 1900 may be configured to display a notification to the first user about the response. For example, notification 1902 indicates that the second user has accepted an appointment invitation at a particular time and date. Notifications may continue to be listed on user interface 1900, and the user may clear the list, respond to a particular notification, etc.

Figure 20:
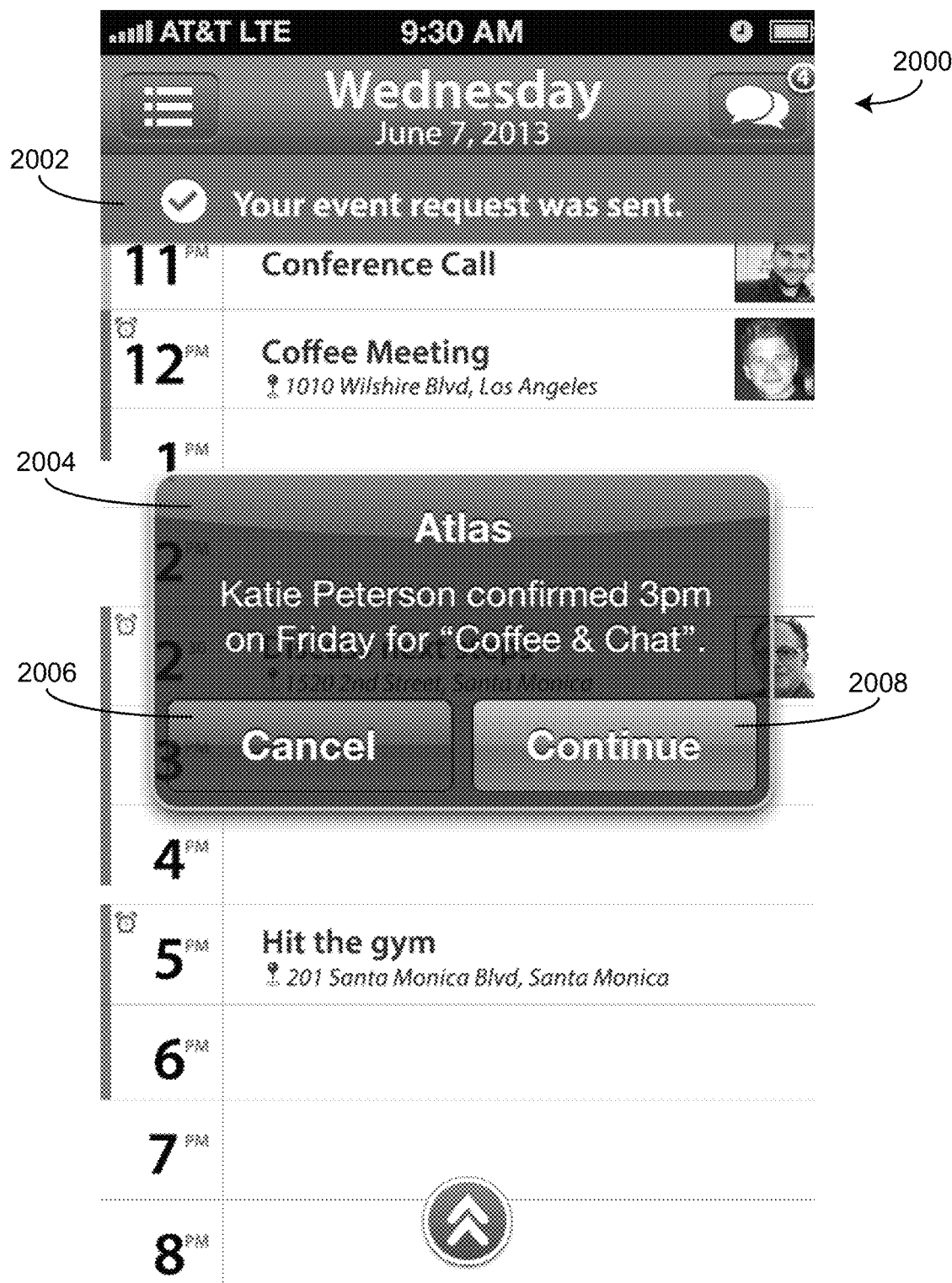

Referring to FIG. 20, user interface 2000 illustrates an example push notification 2004. Push notification 2004 may pop up after another user has accepted an appointment invite. The user may confirm the appointment via button 2008, or may cancel or edit the appointment via button 2006. Also illustrated in user interface 2000 is alert 2002. Alert 2002 may pop up on user interface 2000 after a user sends out an appointment invitation.

Figure 21:
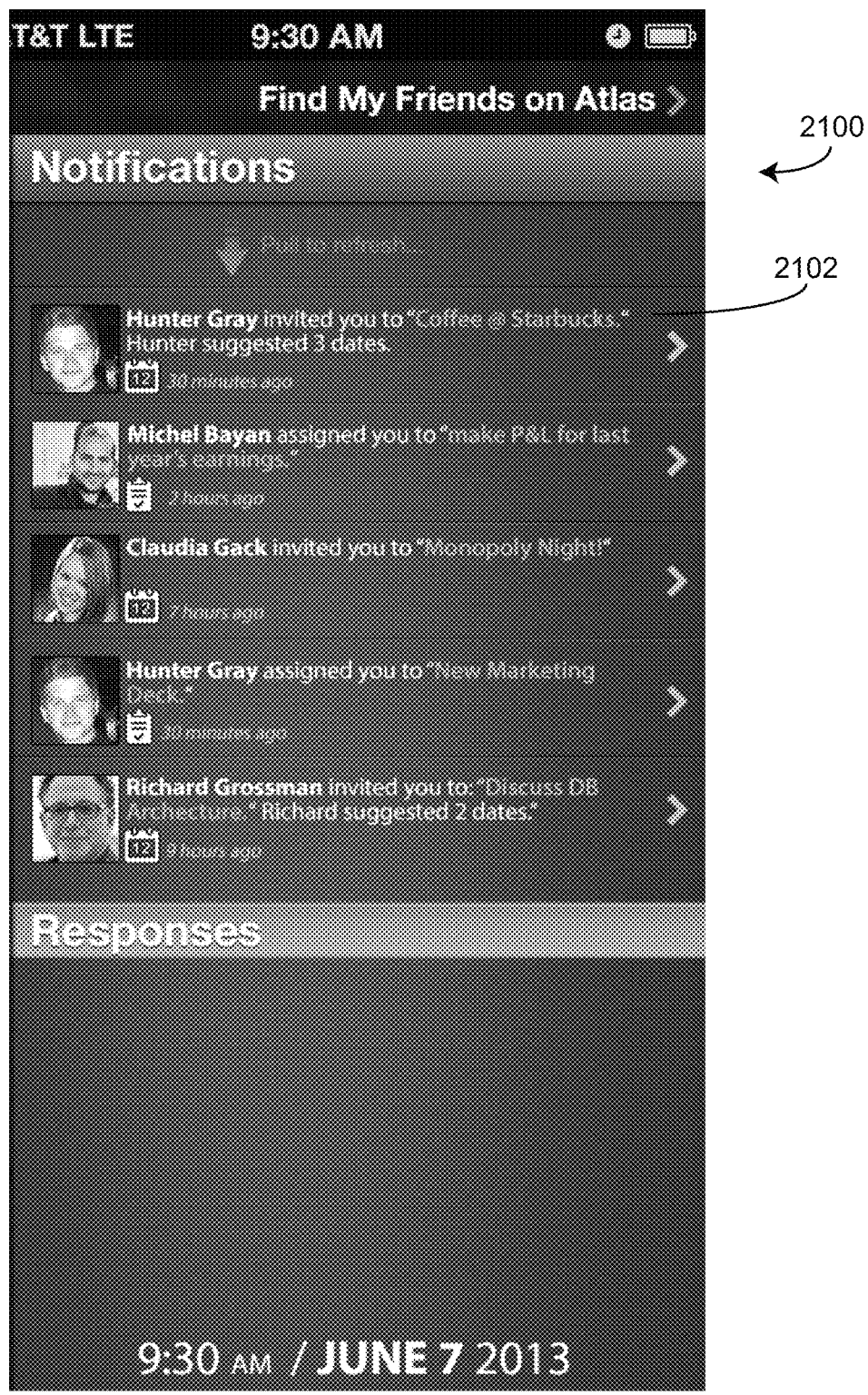

Referring to FIG. 21, user interface 2100 illustrates another notification list. Compared to user interface 1900 of FIG. 19, user interface 2100 may be a user interface on a second user's remote device, indicating to the user that he or she has received an invitation to an appointment. Notification 2102 may indicate the person who send the invitation, along with a title, location and other information, including the proposed appointment times.

Figure 22:
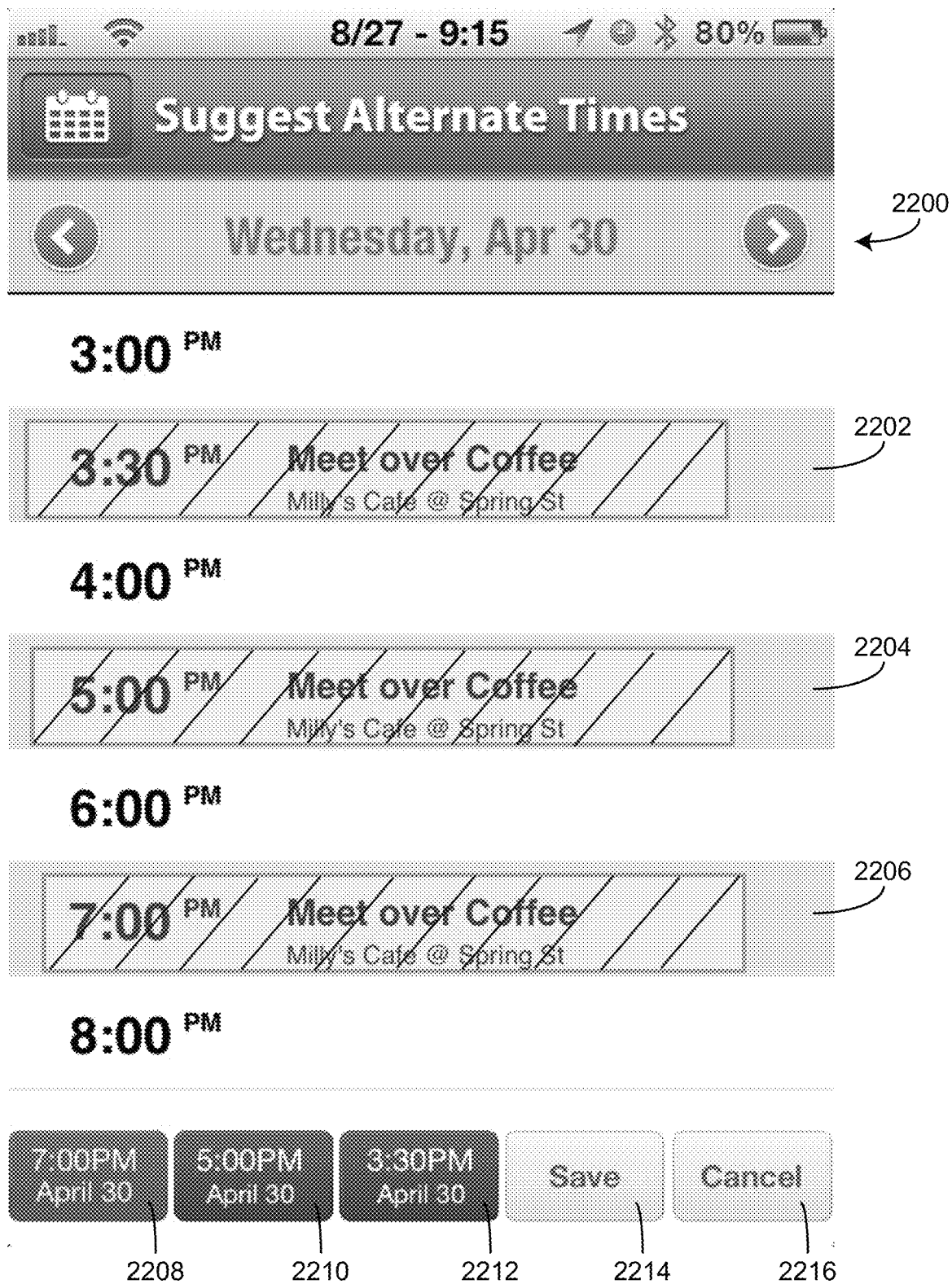

Referring to FIG. 22, user interface 2200 illustrates a method of selecting an appointment time. User interface 2200 may be provided on, for example, a remote device of a second user. Three possible appointments 2202, 2204, 2206 are displayed on user interface 2200 for the user to view. At the bottom of user interface 2200, the three times 2208, 2210, 2212 corresponding with appointments 2202, 2204, 2206 are shown. The user may select an appointment to approve either via selecting an appointment 2202, 2204, 2206 or selecting a time 2208, 2210, 2212. The user may confirm the selection via button 2214, or cancel the appointment via button 2216.

User interface 2200 is shown as an example of a contextual view of the appointment. The appointment may be received by the remote device, and may be used to populate the calendar with an entry for the appointment for each appointment time. The user may then choose an appointment time, vote on the appointment times, or otherwise interact with the appointments using the calendar application as shown in FIG. 22, without using a separate application. In FIG. 22, user interface 2202 is highlighted in yellow, orange or through a pattern 2203 as shown in time slot 3:30 PM. The highlighting or the indication allow the user to show that one of the selections could occur at 3:30 PM. Similarly, the next suggested time may be 5:00 PM and it may be highlighted. 7:00 PM may also be highlighted.

Figure 23:
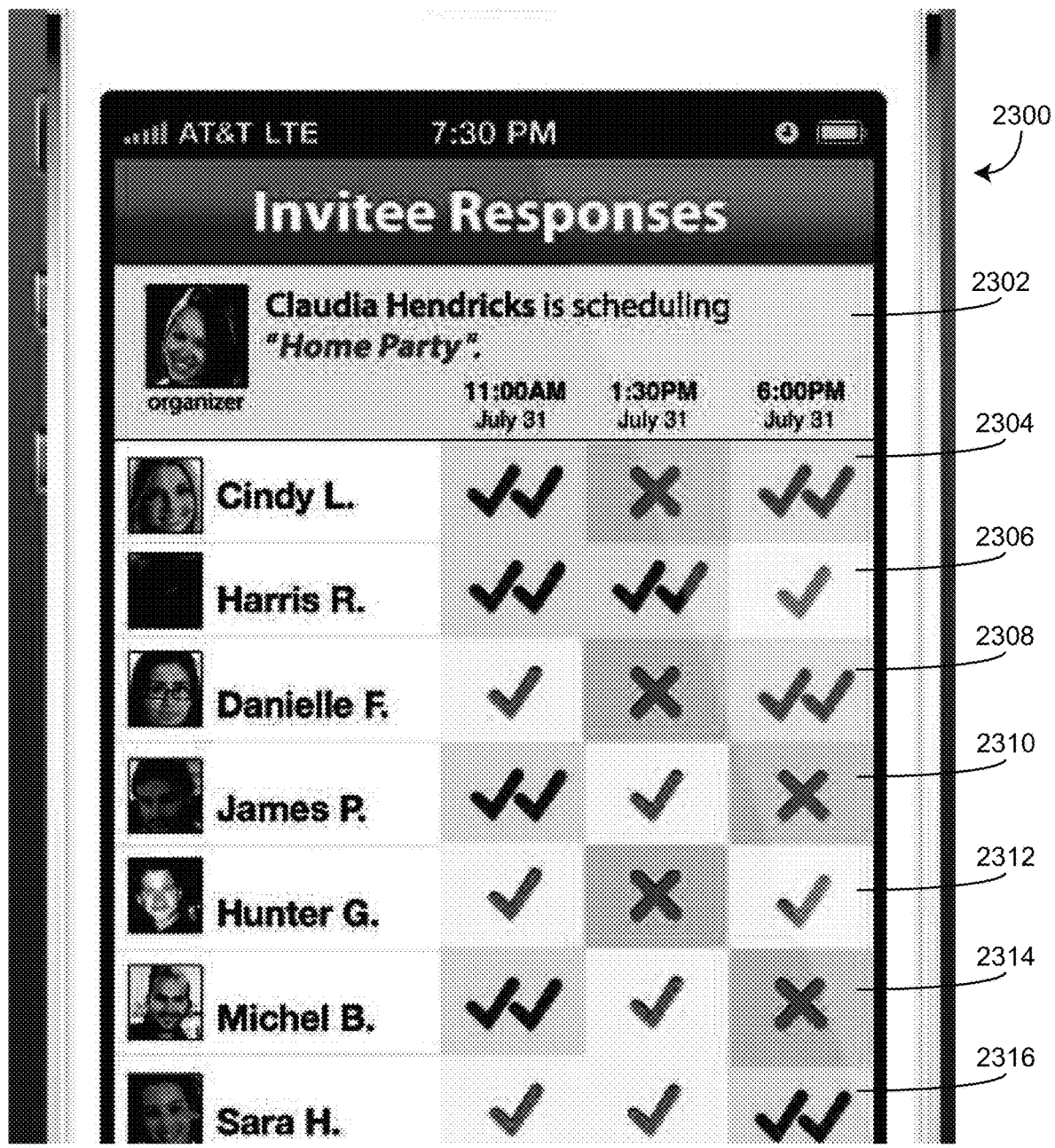

Referring to FIG. 23, user interface 2300 illustrates a feature of group scheduling available to the inviter (e.g., the first user). User interface 2300 may be used to display user responses to a plurality of proposed appointment times (11 AM, 1:30 PM, and 6 PM as shown in FIG. 23) for an appointment 2302. A plurality of users 2304-2316 are shown as having responded to each proposed appointment time.

The user may select, for each time, whether the appointment time is ideal, okay, or not okay. In one embodiment, two checkmarks may represent ideal, one checkmark may represent okay, and an X may represent not okay. The user may view the various responses on user interface 2300 and select a best time based on the responses.

Figure 24:
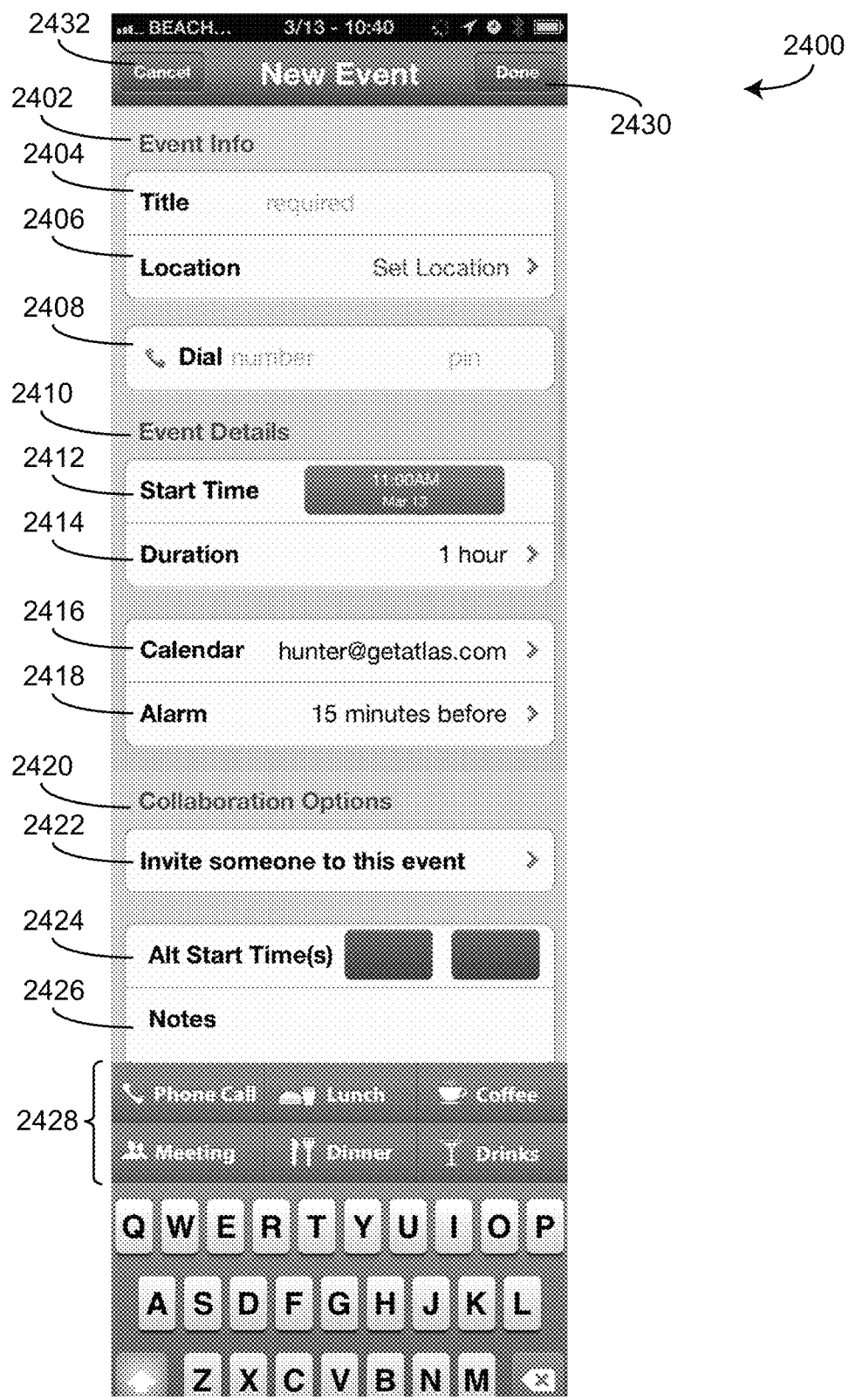
Figure 25:
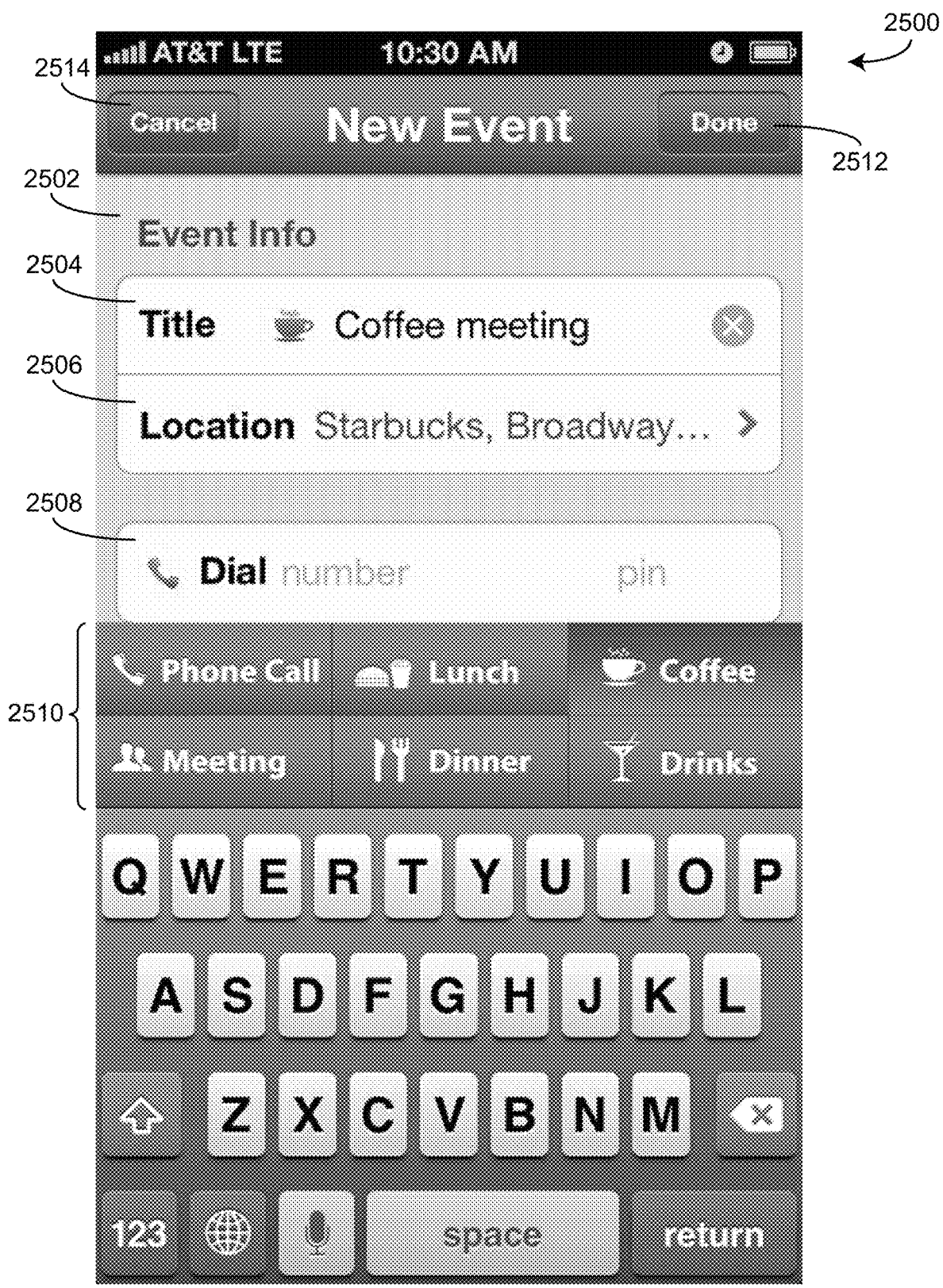

Referring to FIGS. 24-25, user interfaces 2400, 2500 may be provided when a first user is setting up a new event or appointment. User interface 2400 may be an expanded view of options available to the first user when setting up the appointment, which user interface 2500 may be a collapsed view of options available. User interface 2400 is shown to include an event information section 2402, event detail section 2410, and collaboration option section 2420 are shown. In event information section 2402, the first user may provide a title 2404 for the appointment, a location 2406 of the appointment, and contact information 2408 for the appointment. For example, if the appointment is a meeting in a conference room that other users may call in to participate, the first user may specify such contact information in field 2408.

The first user may, in event detail section 2410, identify a desired start time 2412 of the appointment, and a duration 2414 the appointment will be scheduled to last. The first user may further a calendar application 2416 to send the invitation to and an alarm 2418. Alarm 2418 may be used to alert the first user at a set time before the appointment that the appointment is about to begin.

The first user may, in collaboration option section 2420, specify one or more users to invite to the appointment in field 2422. The first user may also specify other alternative start times for the appointment to provide as options to the other users. The first user may also provide other notes 2426 or information related to the appointment to send to the other uses. The first user may further specify a type of appointment by selecting one or more of buttons 2428. For example, the first user may specify if the appointment will be held via a phone call, if the appointment will be held over lunch, dinner, coffee, drinks, etc., if it is an in-person meeting, etc. When done, the first user may confirm the appointment via button 2430, or the first user may cancel the appointment via button 2432.

In user interface 2500, a collapsed version is shown that illustrates an event information section 2502, indicating a selected title 2504, location 2506, and contact information 2508 (e.g., a phone number to dial). The first user may view user interface 2500 to verify the creation or editing of the appointment. User interface 2500 further includes elements 2510 that indicate a selected type of appointment. The first user may verify the appointment via button 2512 or cancel the appointment via button 2514.

Referring generally to FIGS. 26-29, user interfaces are shown that illustrate various method of displaying notification information. Notification information may generally include a list of three different types of notifications: notifications that a user has to respond to, notifications indicating that another user has to respond, and notifications that indicate that an appointment has been booked or finalized. Notification information may be assembled as generally shown in FIGS. 26-29 to organize all notifications for a user into a single screen, for easier viewing.

Figure 26:
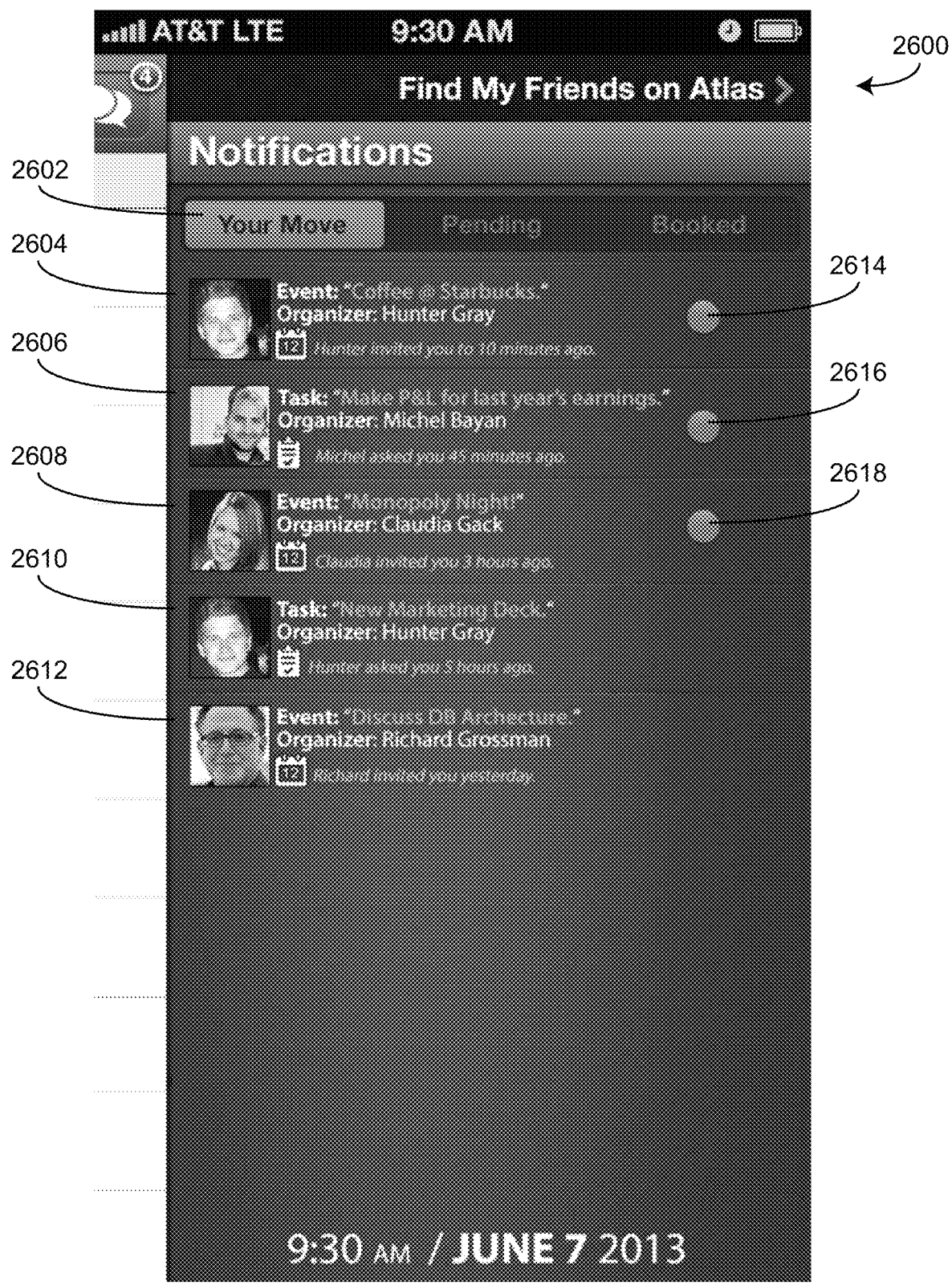

In user interface 2600 of FIG. 26, the user may view a list of notifications that require a response from the user (indicated by element 2602). The list of notifications 2604, 2606, 2608, 2610, 2612 may include an identification of the user awaiting the response, the title of the appointment, and a time at which the notification arrived (e.g., when the other user sent the notification. User interface 2600 may further include elements 2614, 2616, 2618 that may indicate an importance of the appointment, a particular time that conflicts with the user or is ideal for the user, or otherwise.

Figure 27:

In user interface 2700 of FIG. 27, the user may view a list of notifications that require a response from another user (indicated by element 2702). The list of notifications 2704, 2706, 2708, 2710, 2712 may include an identification of the one or more users that need to respond, a title of the appointment, an organizer of the appointment, and a timestamp indicating when the request for a response was sent. User interface 2700 may further include elements 2714, 2716, 2718, 2720, 2722 that may indicate an importance of the appointment, a particular time that conflicts with the user or is ideal for the user, or otherwise.

Figure 28:

In user interface 2800 of FIG. 28, the user may view a list of notifications that were generated based on an acceptance or booking of an appointment (indicated by element 2802). For example, notifications 2804, 2806, 2808, 2810, 2812 are booked appointments. Notifications 2804, 2806, 2808, 2810, 2812 may indicate the appointment title, organizer (first user), and a time at which the appointment was booked or finalized. User interface 2800 may further include elements 2814, 2816, that may indicate an importance of the appointment, a particular time that conflicts with the user or is ideal for the user, or otherwise.

Figure 29:
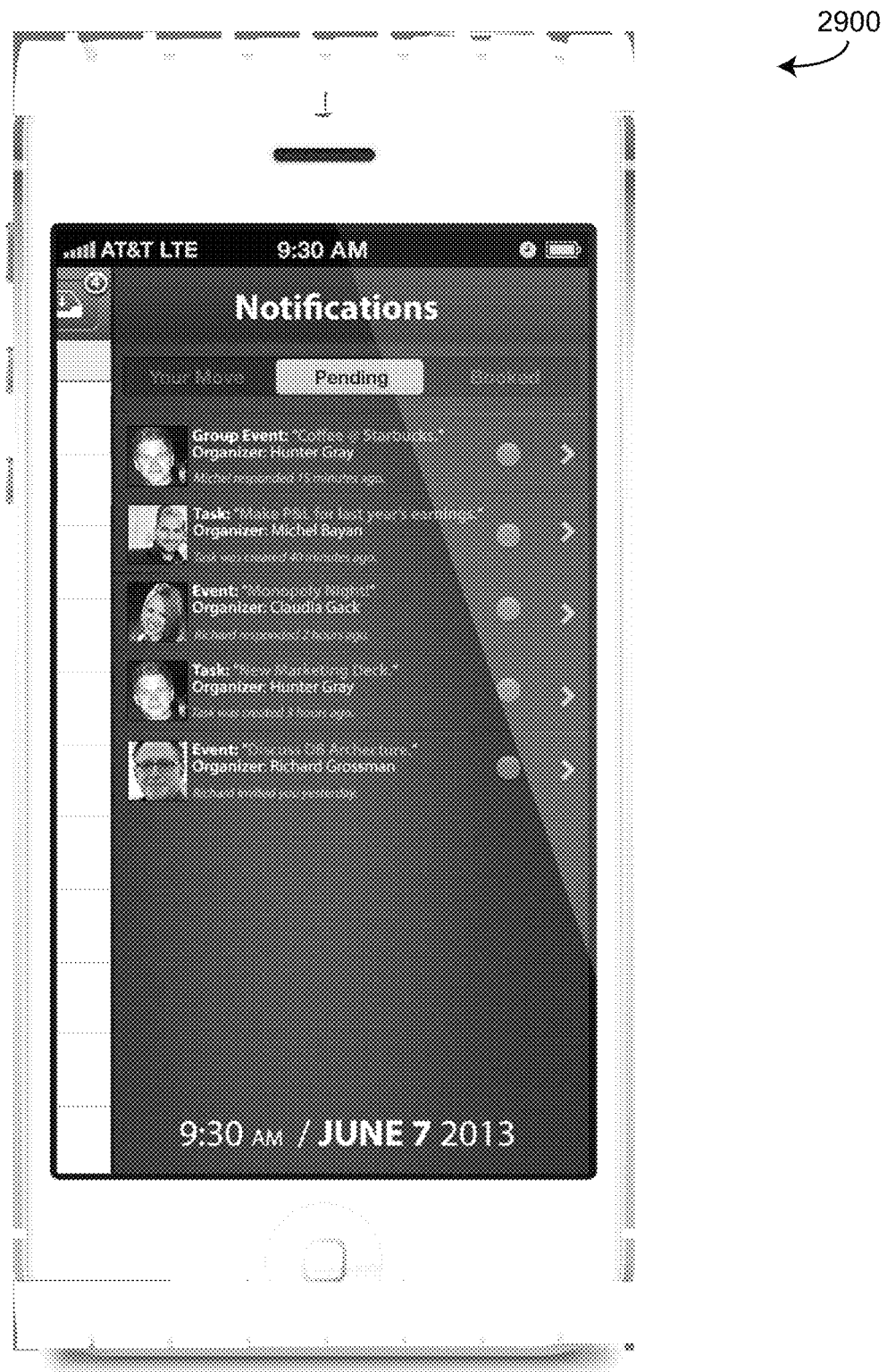

Referring to FIG. 29, user interface 2900 may be a display similar to user interface 2700 of FIG. 27, displayed on a mobile device.

Figure 30:
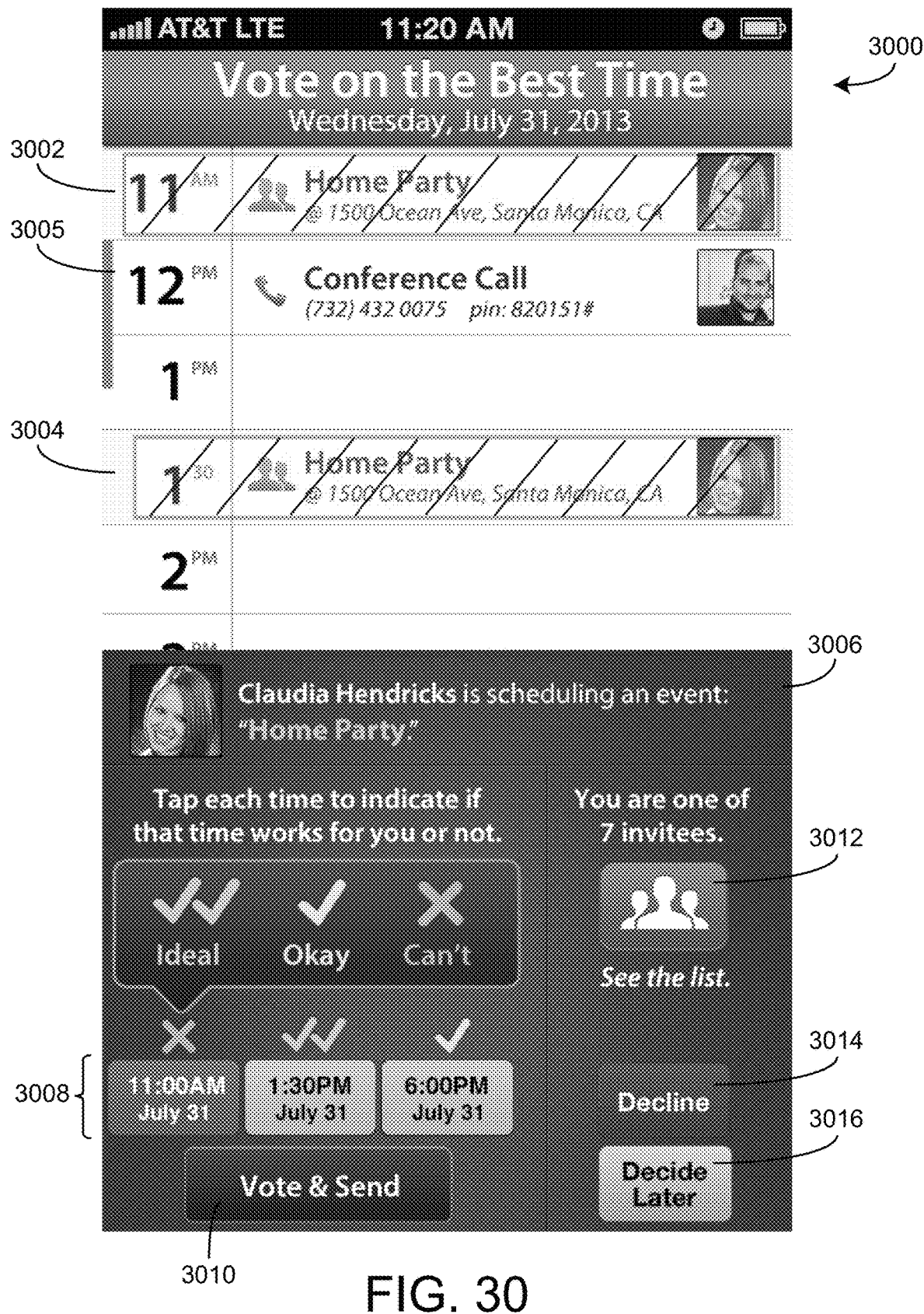

Referring to FIG. 30, user interface 3000 may be used by a second user in order to vote on possible appointment times in a group scheduling process. User interface 3000 includes calendar entries 3002, 3004 that are created when the user is sent the appointment invitation. Calendar entries 3002, 3004 are marked as tentative until the appointment time is finalized. User interface 3000 further includes a second portion 3006 in which the user may provide feedback for specific appointment times. For example, for each appointment time 3008 listed, the user may tap the button for the appointment time to change a status (ideal, okay, can't, or another status). When finished, the user may finalize his or her selections by tapping button 3010. The user may further view who else has been invited via tapping button 3012. By tapping button 3012, a list of other users may be presented, along with the voting results of the other users if they have already voted on the appointment times. The user may further decline the invitation by tapping button 3014 or postponing making a decision on the appointment by tapping button 3016. Calendar entry 3005 may reflect an existing appointment that exists in the user's calendar application (e.g., Outlook, iCal, Google Calendar, etc.). If entries 3002, 3004 were in conflict with entry 3005 or another existing calendar entry, an indication of the conflict may be made to the user of the remote device. Calendar entry 3002 may be highlighted, use a different color that indicates the current voting status.

Figure 31:
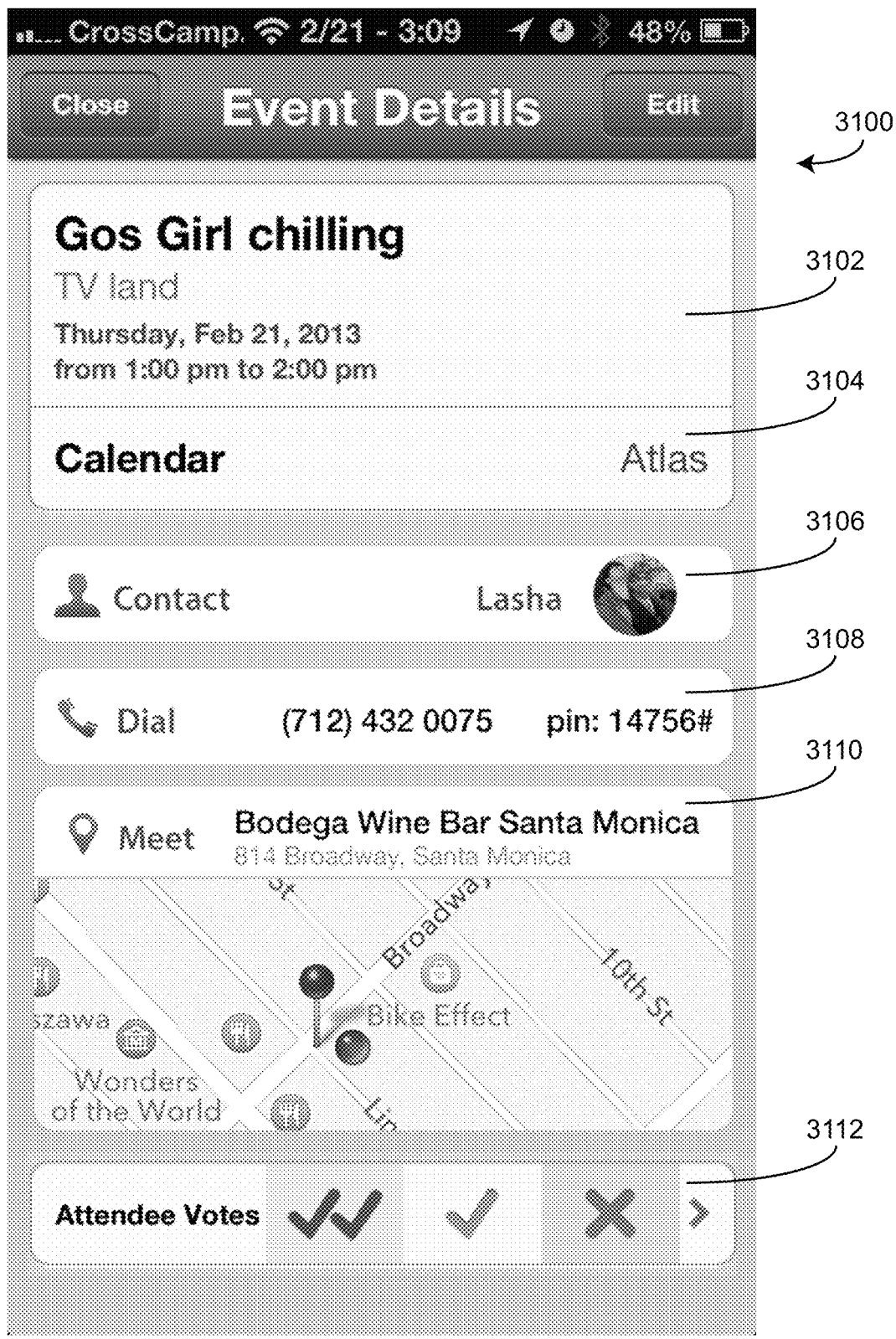

Referring to FIG. 31, user interface 3100 may be a user interface provided to a user wishing to view appointment details. User interface 3100 includes a field 3012 that includes a title and description of the appointment, along with the date of the appointment. User interface 3100 further includes a field 3104 that indicates a calendar application in which the appointment has been entered into. User interface 3100 further includes a contact field 3106 indicating a inviter (e.g., first user) to contact about the appointment and a contact field 3108 that relates to the inviter. User interface 3100 further includes location field 3110 that identifies the location of the appointment, and may include a map or other visual or direction information. User interface 3100 further include field 3112 which may allow the user to see others' votes on potential appointment times.

Figure 32:
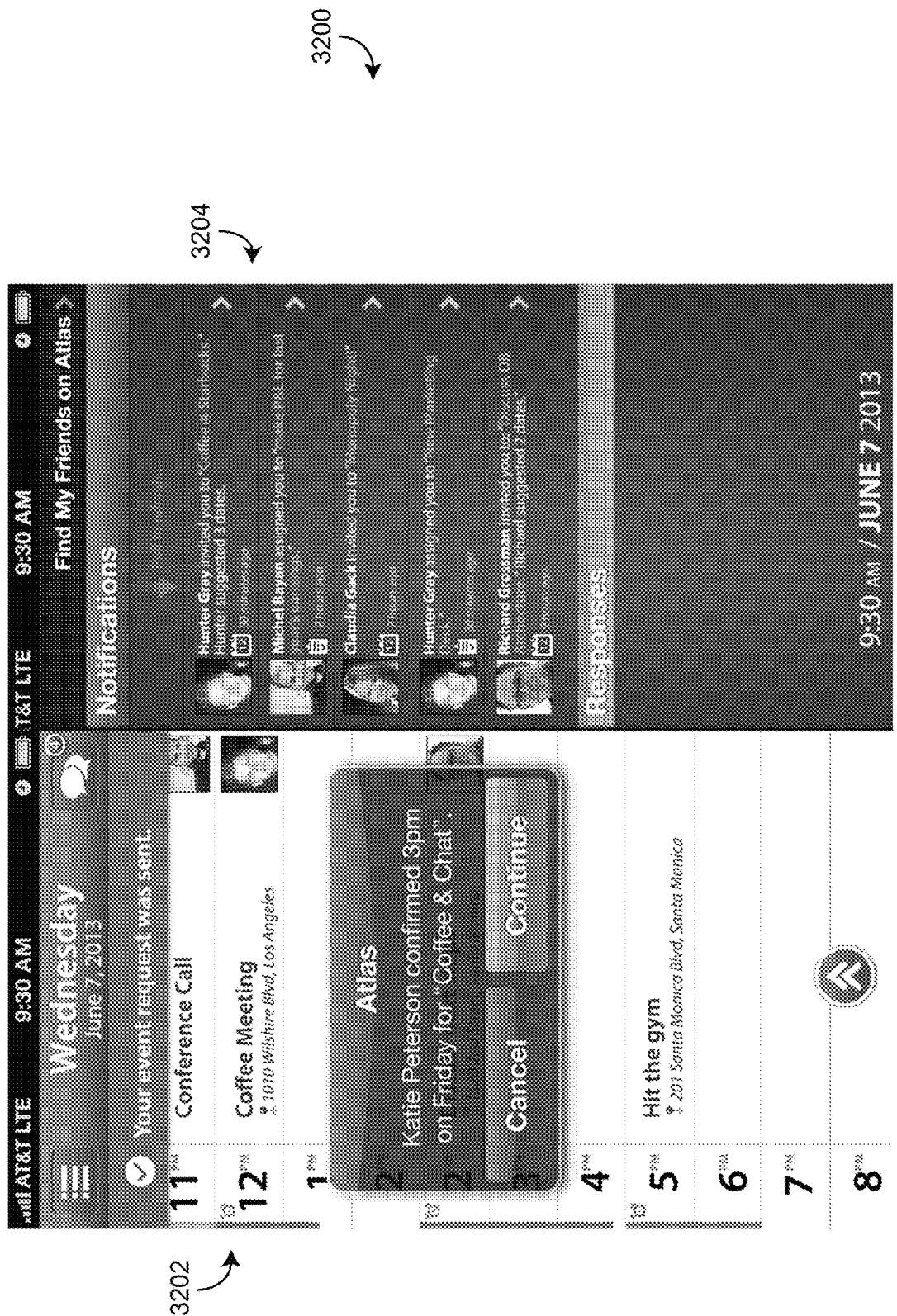

Referring to FIG. 32, user interface 3200 includes a first section 3202 and second section 3204. Sections 3202, 3204 may be similar to user interfaces 2000, 2100 as described above. In the embodiment of FIG. 32, sections 3202, 3204 may be displayed side-by-side for the user.

Figure 33:
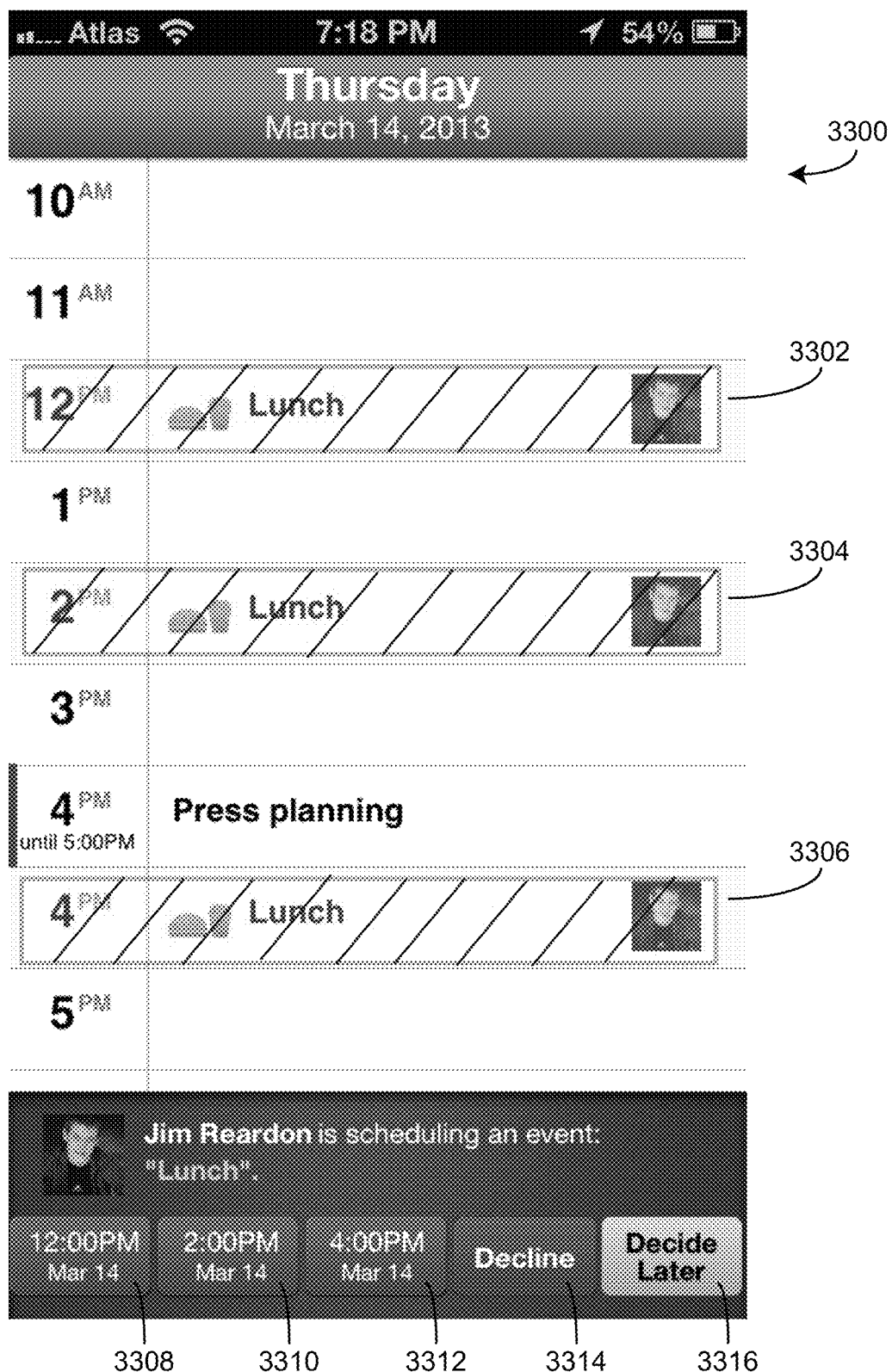

Referring to FIG. 33, another user interface 3300 is shown that includes a calendar application. In the embodiment of FIG. 33, an appointment has been sent to a user, and the calendar application of the user or a third party calendar populates the calendar with three separate appointments 3302, 3304, 3306 representing the three possible appointment times that were proposed. At the bottom of user interface 3300, the user may select one of the three appointment times 3308, 3310, 3312 for the appointment, or the user may select the desired appointment from the calendar above. The user may further decline the invitation via button 3314 or postpone a decision on the appointment via button 3316. The contextual view in FIG. 33 allows to user to realize that there are two 4 pm appointments and further the conflicting appointment may be highlighted or filled with a patter to show the context to the user. The context allows the user to make an appropriate selection.

Embodiments include a group scheduling system to facilitate meetings (in-person or remote). Embodiments eliminate the typically painful back-and-forth scheduling process and transform the meeting negotiation process into a sleek, elegant, mobile decision-making platform. Scheduling is unnecessarily painful and may require multiple e-mails back and forth among various groups of individuals. Embodiments reinvent how people schedule meetings using mobile devices and other devices. Implementations allow social interaction have the necessary structure to allow real plans to form and solidify. Implementations allow users to setup a group based chat as well as an event based chat. In some embodiments, the user doesn't have to create an event with people, but rather the user creates a group and then one or more users adds plans at a later time. Accordingly, embodiments allow a user to start a group chat without a scheduled plan. Each of the one or more plans includes a time and location information.

In various implementations, the system described herein allows a user (organizer) to invite someone or a group of people with a quick message regarding a meeting or an event. The user may suggest a plan with a specific time and place or multiple plans with different or same time or location. Alternatively, the user may suggest a plurality of plans with different times and different places. The users may vote for their most preferred plan. The user may vote by selecting a button to indicate approval or selecting an option to indicate disapproval. In other embodiments, the users may send text messages to the group of invitees. The user may suggest different locations and each of the other users may vote to indicate their preferences. Each user may provide comments regarding each plan, the input may include location preferences, links to ratings sites (e.g. Yelp®, Google®, etc.) or user ratings. In some embodiments, the users each may rate the location to allow the organizer to choose the appropriate plan to book. After or before receiving each user's input the organizer may book the event and enjoy their meeting at the booked location. In various embodiments, the users may chat with all of the invitees relating to the event. Each event or meeting may have a chat screen, so the user does not have to look up the contact information for each user that is invited. Accordingly, when the user is not going to arrive on time or the user is late, the user can inform all of the invitees regarding their status via a text message that is connected to the event.

Friends and colleagues may use various embodiments to maintain relationships and cultivate those relationships. Groups may want to schedule in-person and local meetings. Using various embodiments allows people to get together and give people back those valuable seconds, minutes and hours of planning Embodiments are directed to time and place combinations using chat-based communication. So you're really voting on a set plan vs. time and place being independent of each other. In other embodiments, phone calls may be used to schedule meetings. Any meeting or event may include either a time and geographic location (a venue or a street address) or a time and virtual location (phone calls, Skype, webinars, anything where people are connecting synchronously). Each of the above decisions and voting between users may occur using messaging. Embodiments comprise consensus scheduling through mobile messaging. Chat with local meetings, but not limited to, local meeting because other modalities like scheduling a Skype call, FaceTime®, video chat or phone call may be performed. Embodiments are directed to scheduling event via SMS, chat and appointment negotiation through messaging and voting.

Various embodiments include using a mobile device as a hub to schedule meetings or events or group meetings or events through mobile messaging and/or chat provided by the application. Embodiments allow a user to send text messages back and forth but also to send potential meeting times and meeting places within the same system and the for the same meetings. These meeting places and times shown in the messaging system also propagate to a screen that allows all users of the system to see a snapshot of all the available times and places where the user can vote for or against any particular time and/or place. These may be times and/or places combinations or individual times and individual places. Users of the system can indicate their preferences so the organizer can book the final time based on the votes or the organizer's preference. The system allows non-users to respond via text message and via a mobile webpage for the event. All booked appointments synchronize back to the user's calendar whether iCal, Google, Exchange, etc. The messaging becomes a channel for communication and negotiation. The system may prevent users from seeing other user's calendar availability but the system may be permitted to access other users calendars. Users can suggest times that are most agreeable and the system can acknowledge whether the second user will be free or busy during the suggested time.

Various embodiments include structured and unstructured methods of creating an event or meeting. Embodiments allow the user to start by inviting some people with a simple message to a group chat. In various embodiments, the group chat is an event based group chat (title or no title, and that is a difference between email with title and SMSs without titles).

Embodiments comprise purpose-driven group chat messages that have an ability to allow the user to add a plurality of formal plans. Embodiments include a platform that receives as input a plurality of plans and narrows the plan down via a decision making process to a booked plan from among a plurality of plans. Various embodiments allow users to add formal structured plans. The interactions between people may be like conversations. Embodiments may store a log of the plans on a structured area of the application that the user can easily get to by clicking on the plans that popup in the chat. When the users receive a structured plan the users receive lots information that may be needed to make a decision and vote. Information such as who is invited, who has voted for the different available plans, the location of each plan (with quick ability to see it on a map and receive get directions from within the application. The users may receive the time for each plan (with the unique ability to quickly see their calendar within the application so the user can check their availability). Get other "venue-related" info such as, menu, third party ratings, etc. The user can view if the location is a virtual location and it is a phone call, the user can get all the dial-in information so they don't have to manually dial and the system will input the pin number or meeting number in for the user after dialing the number.

Embodiments allow a user to vote and/or poll structured information that includes time and/or location scheduling. Event-based chat is available as long as the event has not occurred. The chat messages continue to be available to the user until the event time has passed. Once the event has ended the chat messages may be archived to be retrieved later. In other embodiments, the mobile device may include a plan mode. In the plan mode events may be allowed within group-chats. Accordingly, in some embodiments the system may include group-based chat and a plan mode. Thus you could be in a long group chat and someone in the group may try to schedule an event with this group. When the user attempts to schedule an event or a meeting the mobile device may enter the group plan mode. In plan mode, the chat would be group but the planning elements would all be available in plan mode. This embodiment allows scheduling through group chat and not just scheduling through event chat.

FIG. 34 is the event set-up screen 3400. In field 3410 a user can add the names of the invitees that a user wants to invite to the event or meeting. In some embodiments, field 3410 may receive telephone numbers, e-mail address, or other contact information for the invitees. To assist the user the field may display a guidance message such as "Who do you want to meet?" When the user selects the field 3410 the guidance message may be removed from the field. Title field 3420 is the optional title of the event or a title for a group of people in a chat scenario. A user may type in any title possible. In some embodiments, the memory of the device or application may recall the previous events that the user has typed in and search and provide the names of the previous events as an option for the current name. In some embodiments, the title may be auto filled into the title filed. In yet other embodiments, a list of default titles may be shown to the user after the user selects the title field 3420. The user can choose to change the title of the event at a later time event after the event has been booked. Each of the invitees may be informed regarding the change of title via push message, text message or an updated web page. In some embodiments, the title field 3420 may be left empty and the user may input the title at a later. Field 3430 is a field that allows the user to choose a date and time for a first plan for the event. Selecting the field 3430 may also open a time and location selection screen. After selecting the field 3430 the user may add the time and location of the event.

FIG. 35 is a display screen 3500 that may be displayed after the user selects field 3410 in screen 3400. In screen 3500 the user may have selected invitees shown in area 3520. In the example shown in screen 3500, the user may select additional invitees such as "Charles Francis" 3530. The user may have selected two invitees, for example, "Hunter Gray" and/or "Linda Lee". In some embodiments, the list of proposed invitees may be from the user's mobile device's contact information. In other embodiments, the list of invitees may be generated based on a third party contact provider. In some embodiments, the mobile device may receive the user's authentication information (login and/or password) for social networks (e.g., Facebook®, LinkedIn®, Google+, etc.). After receiving the authentication information the mobile device may use the API to access the contact information of various additional contacts that may or may not be stored on the contact information on the mobile device. In some embodiments, users that have already been registered to the application are identified with an indication "chat+k". The mobile device may communicate with a server computer to determine which of the phone numbers or e-mails of the invitees has been previously registered with the client application on the mobile device. When a user has previously registered the user receives push notification through the application platform, or text messages based on the selected settings. Users that have not previously registered receive message through the SMS, or text message platform. In various embodiments, the server computer determines the method of communication based on previous registered user lists. Area 3520 indicates who has been added to the invitation list. Contacts 3530 and 3540 identify persons from the user's list of contacts that may be potentially added to the invitee list.

FIG. 36 shows a screen 3600 that allows a user to choose a date and time for the meeting or event after the user selects field 3430 from FIG. 34. The screen 3600 allows a user to choose to view a monthly, weekly or daily view. The user may choose a date in the calendar view 3605 and the user may select a time in the time area 3610. In the example shown in FIG. 36 the user may be able to choose the date in area 3610 and the chosen date may be shown on the calendar. The user is offered a user interface to select a date and time from the screen 3600 for the event. As discussed in greater detail below the user may be provided the option to select multiple different times or for a single event.

FIG. 37 is the daily calendar screen 3700. Screen 3700 shows the mobile device of the user calendar for the selected date and shows all events occurring on the date selected. In some embodiments, the daily calendar screen may show the events planned by the appointment system 104. In other embodiments, the events may be show events that have been planned, but are not booked. In various embodiments, some tentative plans may be removed from the calendar once one of the plans related to the event are booked. Screen 3700 shows the date 3710 at the top of the screen. Other appointments may be shown on screen 3700.

FIG. 38 is the location choice screen 3800. The appointment system uses the mobile device's geo-location to search nearby restaurants, bars, conferences centers, sporting events, concerts, entertainment sites, festival or local event. The user may select the venue location 3802 button to access the mapping functions of the mobile device. Location indicator 3804 shows the users present location. Other locations 3810, 3820, and 3830 that may have been previously selected by the user may be shown on screen 3800. The user may select any one of the previously selected locations. The user may select one or more of these venues to suggest an event location to meet with the invitees selected in FIG. 35.

Once a location is selected, FIG. 39 shows a display 3900 that shows a map view of the selected event location. Screen 3900 also displays a map 3910 that displays the location of the restaurant. The user can choose to get directions by selecting the get direction button 3920. The mobile device's navigation software may navigate the user to the location for the event. In various embodiments, the address information for the location of the meeting may be communicated from the appointment system to the navigation system of the mobile device.

Figure 40:
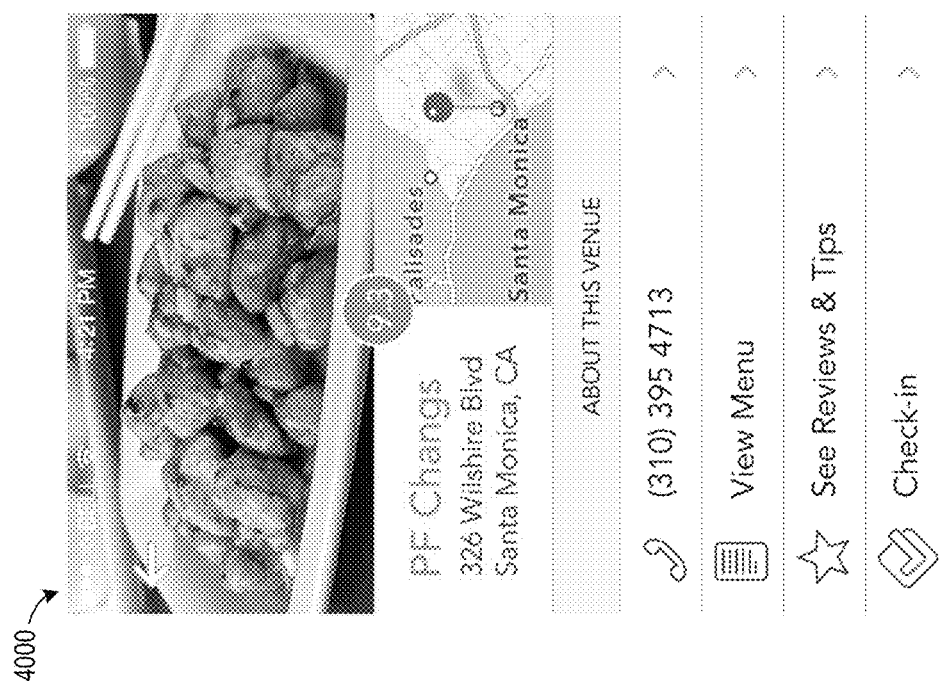
FIG. 40 is a user interface screen that may be generated by the system shown in FIG. 1, according to an exemplary embodiment.

FIG. 40 shows the selected event location's information including their street address, phone number, menu, reviews, and gives the user the opportunity to check-in 4040. Screen 4000 displays an image 4010 regarding the location posed by the owner of the location. Another portion of the screen 4000 may include the name and address 4015 rating 4020, map 4025, information about a venue 4030. As shown in screen 4000 the user may call the location using phone number 4031, menu 4032, reviews 4033 and check-in 4040. The user is also given the option to agree to attend (by selecting the check) or deny (selecting the x) attending the event. User may then select any of these prompts to review further information pertaining to the selected location.

Figure 41:
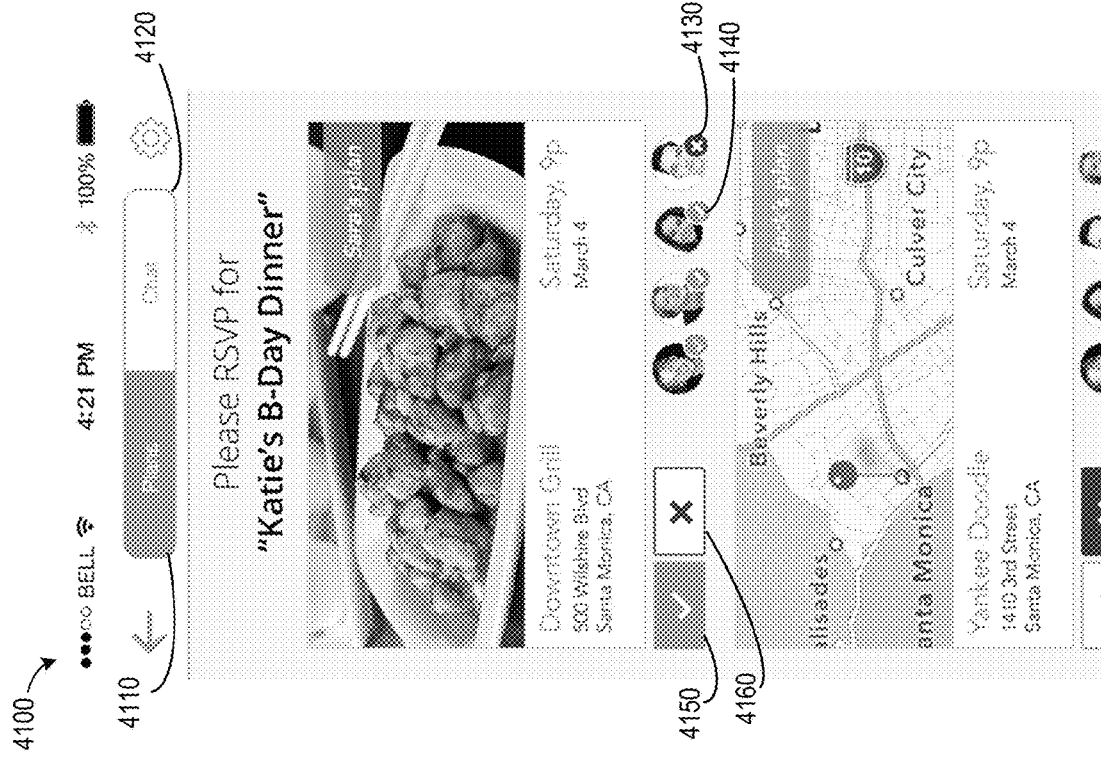
FIG. 41 is a user interface screen that may be generated by the system shown in FIG. 1, according to an exemplary embodiment.

FIG. 41 is the plan screen display 4100. Screen 4100 shows the various plans regarding the event. Plans tab 4110 may be selected by the user to view the various plans regarding an event. In the plan view, the information regarding a plan may be displayed with an image and information regarding each invitee's votes regarding a plan. The user may select chat window button 4120. The chat window may display various messages that the user has sent to the group of invitees and the messages that the groups of invitees have sent to the group regarding any one of the plans. In various embodiments, each plan may have its own list of text messages. Check mark 4150 and mark 4160 prompts the user to select whether or not they are planning to attend the event. The user may select the check mark 4150 to attend the event, or the "x," 4160 to decline. A check mark 4140 placed adjacent to the image or identifier for each invitee identifies which invitees are attending the event and decline indicator 4130 identifies which attendees will not be attending the event. Chat window 4120 takes the user to an alternate screen in which the user can send or receive messages with the other attendees regarding the event. As shown on the plans screen additional locations or plans by other individuals may be displayed. For example, screen 4100 shows "Sara's plan" and "Jack's plan", accordingly, the each invitee can suggest their own plan to all invitees. All invitees are offered the option to endorse each one of the plans.

Figures 42, 43:
FIG. 42 is a user interface screen that may be generated by the system shown in FIG. 1, according to an exemplary embodiment.
FIG. 43 is a user interface screen that may be generated by the system shown in FIG. 1, according to an exemplary embodiment.

FIG. 42 shows the chat screen 4200 where attendees can text back and forth in a group text with the other attendees regarding the event. In some embodiments, this chat screen 4200 may not be included in the mobile device's general text messages and is remote to this event. As shown in screen 4200, plans from some users may appear in the chat screen 4200 and in the plans screen 4200. Text messages, videos, images, and the like may also be shown in text messages screen. Messages may be displayed chronologically as they are sent. In other embodiments, each event or plan may be used by a server computer to generate a web page to be displayed to users who wish to view the events status on a their computer. In other embodiments, the text messages regarding the event may also be displayed on the web page generated by the server computer. In other embodiments, location negotiation among users may occur by one user proposing a location and other users voting for the location.

FIG. 43 displays the event list screen 4300. Screen 4300 lists all of the different events user is invited to, and/or is attending. Organizer 4310, 4330, and 4350 are identified by a symbol displayed adjacent to their image or picture. In the example that is shown in screen 4300 the hosts or organizers are identified by a crown symbol and also includes the contact information or image of the event coordinator. Invitees 4320 and 4330 are listed (by image or initials of their name) after the organizer for each event. The check mark 4340, as well as their image or initials identify the attendees. Non-attendees 4385 are invitees who have indicated that they will not be attending the event. The non-attendees are identified by an "x," as well as their contact image. Status identifiers 4370 and 4380 indicate the status of the event. If the event is still in the process of coordinating the time and place of the event, the status will indicate, "Planning" During this stage, several different locations 4360 and 4395 may be in the process of being agreed upon by all of the attendees. In this case, all of the locations will be identified under the planning stage until the event location and time are agreed upon by at least some of the attendees. Once all of the event details are agreed upon by at least some of the attendees and the event location has been reserved, the status will changed be changed to "Booked" 4380. In various embodiments, a user may be able to add additional plan from within the chat screen by typing in various key terms that have been predetermined for the application to understand the chat message as a plan. For example, when a user types in "add plan, time, location" syntax the chat software may add a plan that includes all of the original invitee. In other embodiments, the plan may be booked based on the number of users that have accepted and so long as the majority of users have accepted the plan may be booked. The organizer always has the option to unbook or book a plan. In other embodiments, the organizer may want to make sure that certain users will most certainly attend or the guest of honor can attend. In various embodiments, the organizer may provide different weightings for different users. For example, the vote of one invitee may count as 2, 3, 4, 5 votes to give that invitee a higher priority. In various embodiments, unless a particular invitee accepts the invitation, a plan cannot be booked. In various embodiments, when the organizer did not create the plan, the organizer must accept the newly submitted plan for the plan to be booked. In various embodiments, the server system may generate a web page based on the event setup by the user. In various embodiments, the booking of an event or meeting may be done automatically by the server computer or performed manually. The systems described here may operate in various modes, such as but not limited to, chatting, planning or booked. In the chatting mode a group of people have no future plans or booked plans. When the system is in a planning mode the group of people have unbooked future plans. In the booked mode the group of people have at least one booked future plan. Once an event is booked and the event is over, the group returns to the "chatting" state and the modes may be reset to start over again.

Figure 44:
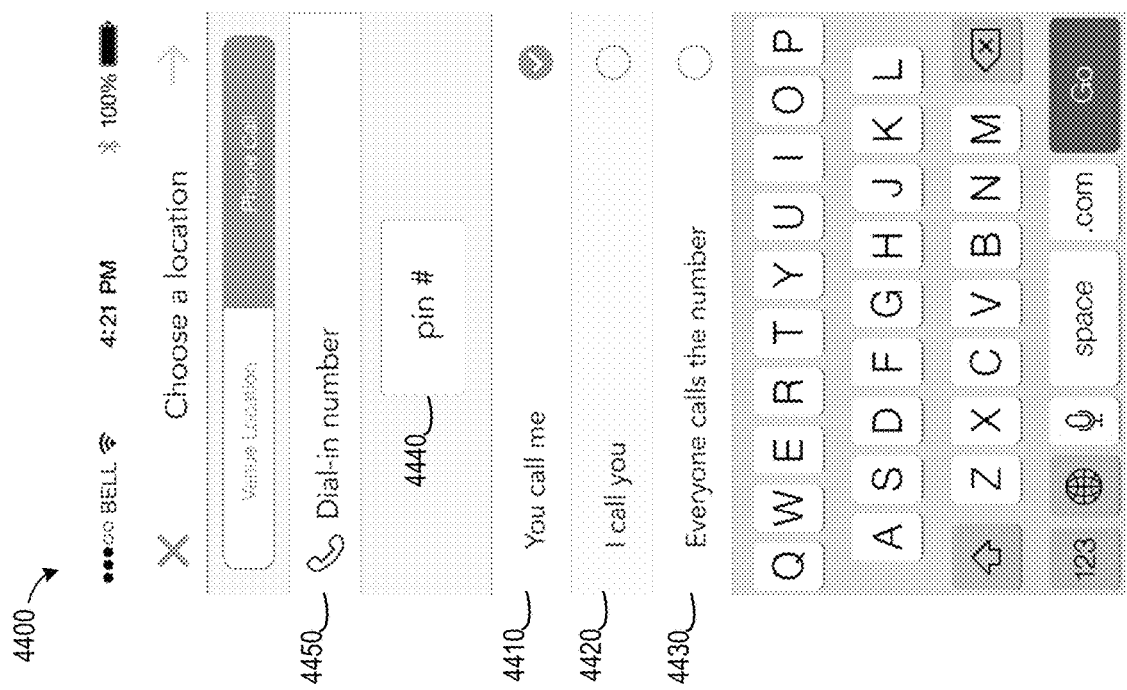
FIG. 44 is a user interface screen that may be generated by the system shown in FIG. 1, according to an exemplary embodiment.

FIG. 44 shows a screen 4400 that may be used for a dial in meeting or event. The user interface from screen 4400 may be used for a non-physical or virtual location with a time instead of a physical location and time. The user may be able to set up a meeting via a phone call with dial-in number information. In some embodiments, once the event has been booked, the event coordinator can select whether all of the attendees will call the event coordinator using option 4410. In some embodiments, the event coordinator may want to call each of the attendees using option 4420. In various embodiments, the event coordinator may determine that all of the attendees will call the dial-in number by selecting option 4430. If the event coordinator chooses to use a Dial-in number 4450 the event coordinator may also assign a pin 4440 to the event for each of the attendees. Various types of messaging protocols may be used to communicate between various uses.

Embodiments may include a system and a method where a user can choose to form a form a group that comprising of a plurality of members. The group may be formed by the user choosing to add each group member into a list of individuals using their contacts. Other users may be able to add members to the group. Embodiments may include sending or receiving one or more group chat messages to or from each of the members in the group. In various embodiments, the member of the group may send one or more chat messages to group members for one or more plans for a meeting. In various implementations, the calendar system of each of the group members may be updated based on the received chat message or update the calendar system of each of the group members by placing a tentative calendar event based on the received chat message. In other embodiments, the method may include tracking the geolocation of each of the group members and alerting the group members when one or more of the group members are in a geographic vicinity of each other.

The present disclosure describes the appointment negotiation process as occurring between a first user on a first remote device and one or more second users on a second remote device. In one embodiment, a single user may use more than one remote device during the process. For example, the first user may send an invitation on one device, say a smartphone, then finalize the appointment on another device, say a tablet, if the user is in another location. It should be understood that a user may use more than one device throughout the appointment negotiation process. Further, a user may edit an existing appointment on a different remote device than he or she used to book or negotiate the appointment on originally.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method performed by an appointment negotiation system, the appointment negotiation system including a processor, the method comprising:
    receiving, by the appointment negotiation system from a remote device, a request to generate appointment request messages for a group of members, the request from the remote device including two or more plans for a meeting;
    determining, for each member in the group of members, a corresponding messaging protocol to be used for communicating with the member, wherein the corresponding messaging protocol is at least one of a messaging protocol for short message service (SMS) text messages or a messaging protocol for a user application having push notifications;
    generating and sending a corresponding appointment request message to a corresponding remote device for each member of the group of members using the corresponding messaging protocol for the member, the corresponding appointment request message for each member of the group of members including the two or more plans for the meeting, the two or more plans each comprising corresponding time information;
    receiving responses from the group of members wherein, for each member of the group of members, a corresponding response to the corresponding appointment request message is received using the corresponding messaging protocol;
    updating a corresponding calendar application of each of at least a first member and a second member of the group of members by adding a corresponding calendar event with a time for an appointment for the meeting that is based on the received responses; and
    synchronizing the appointment between a first remote device of the first member and a second remote device of the second member such that a change in the time for the appointment made using the first remote device is automatically applied to an appointment entry for the appointment on the second remote device;
    wherein the corresponding calendar application for the first member is a different calendar application than the corresponding calendar application for the second member.

2. The method of claim 1, further comprising tracking a corresponding geolocation of each member of the group of members and alerting a member of the group of members when one or more other members of the group of members are in a geographic vicinity of the member.

3. An apparatus comprising:
an appointment negotiation system comprising one or more processing circuits configured to execute computer code to perform a process comprising:
receiving two or more plans for a meeting from a remote device of an organizer, each plan of the two or more plans including corresponding time information for the meeting between the organizer and at least two invitees;
generating a corresponding text message for each of one or more of the at least two invitees, the corresponding text message including the corresponding time information for each of the two or more plans;
sending the corresponding text message to a corresponding remote device of each of the one or more of the at least two invitees using a text messaging protocol for short message service (SMS) text messages;
generating a corresponding push notification for each of at least one of the at least two invitees, the corresponding push notification including the corresponding time information for each of the two or more plans;
sending the corresponding push notification to a corresponding remote device of each of the at least one of the at least two invitees using a messaging protocol for a user application having push notifications;
receiving, using the text messaging protocol for SMS text messages, one or more text message responses from the one or more of the at least two invitees, each of the one or more text message responses indicating a corresponding vote among the two or more plans;
receiving, from the user application executed on a corresponding remote device using the messaging protocol for the user application, at least one response from each of the at least one of the at least two invitees where the at least one response indicates a corresponding vote among the two or more plans;
determining based at least partially on the one or more text message responses from the one or more of the at least two invitees and the at least one response from the user application for each of the at least one of the at least two invitees a time for an appointment for the meeting; and
updating a corresponding calendar application of each of at least a first invitee and a second invitee of the at least two invitees by adding a corresponding calendar event with the time for the appointment for the meeting; and
synchronizing the appointment between a first remote device of the first invitee and a second remote device of the second invitee such that a change in the time for the appointment made using the first remote device is automatically applied to an appointment entry for the appointment on the second remote device;
wherein the corresponding calendar application for the first invitee is a different calendar application than the corresponding calendar application for the second invitee.

4. The apparatus of claim 3, the process further comprising receiving from a corresponding remote device of an invitee of the at least two invitees a proposal for an alternative plan that the organizer and the other invitees of the at least two invitees can approve or reject.

5. The apparatus of claim 4, the process further comprising responsive to receiving an approval or rejection for the alternative plan, sending a status message to indicate the approval or rejection.

6. The apparatus of claim 5, wherein the status message is sent to the remote device of the organizer.

7. The apparatus of claim 3, the process further comprising placing a placeholder for each of the two or more plans in a calendar application of the organizer and a calendar application of each of the at least two invitees prior to booking the meeting.

8. The apparatus of claim 7, the process further comprising updating the calendar application of the organizer and the calendar application of each of the at least two invitees to remove each of the plans of the two or more plans that were not booked after determining the time for the appointment for the meeting.

9. The method of claim 1,
wherein said generating includes generating, for each member of the group of members for which it is determined that the corresponding messaging protocol is the messaging protocol for SMS text messages, the corresponding appointment request message as a text message including the two or more plans and information for specifying in the corresponding response a corresponding vote on the two or more plans.

10. The method of claim 9,
wherein said generating further includes generating, for each member of the group of members for which it is determined that the corresponding messaging protocol is the messaging protocol for the user application having push notifications, the corresponding appointment request message as a push notification including application data for causing a graphical user interface to display the corresponding time for each of the two or more plans as selectable items in the graphical user interface.

11. The method of claim 1,
wherein said generating includes generating, for each member of the group of members for which it is determined that the corresponding messaging protocol is the messaging protocol for the user application having push notifications, the corresponding appointment request message as a push notification including application data for causing a graphical user interface to display the corresponding time for each of the two or more plans as selectable items in the graphical user interface.

12. The method of claim 1, wherein the corresponding appointment request message that is sent to the first remote device of the first member includes calendar application data for causing the first remote device to automatically create a corresponding calendar entry for each corresponding time of the two or more plans where each corresponding calendar entry is shaded with a particular color that indicates a tentative calendar entry.

13. The method of claim 3, wherein said updating comprises:
updating the corresponding calendar application of each of at least the first invitee and the second invitee by adding the corresponding calendar event as a confirmed calendar event with the time for the appointment for the meeting and removing tentative calendar entries for unselected times for the meeting that were proposed in the two or more plans.

* * * * *